(12) United States Patent
Dal Pra' et al.

(10) Patent No.: US 8,821,330 B2
(45) Date of Patent: Sep. 2, 2014

(54) SET OF SPROCKETS FOR A BICYCLE REAR WHEEL AND SPROCKET ASSEMBLY COMPRISING SUCH A SET

(75) Inventors: Giuseppe Dal Pra', Zane (IT); Leopoldo Lazzarin, Vicenza (IT)

(73) Assignee: Compagnolo S.r.l., Vicenza (IT)

( * ) Notice: Subject to any disclaimer, the term of this patent is extended or adjusted under 35 U.S.C. 154(b) by 1149 days.

(21) Appl. No.: 12/187,603

(22) Filed: Aug. 7, 2008

(65) Prior Publication Data

US 2009/0042681 A1 Feb. 12, 2009

(30) Foreign Application Priority Data

Aug. 9, 2007 (IT) ............... MI2007A1659

(51) Int. Cl.
| | | |
|---|---|---|
| *F16H 55/12* | (2006.01) | |
| *F16H 55/30* | (2006.01) | |
| *B62M 9/10* | (2006.01) | |

(52) U.S. Cl.
CPC ...................................... *B62M 9/10* (2013.01)
USPC .......................................................... 474/160

(58) Field of Classification Search
CPC ......... B62M 9/10; B62M 9/105; F16H 55/30; F16H 7/06; F16D 41/30
USPC ........... 474/69, 78, 152–160, 164; 301/110.5, 301/59, 124.2
See application file for complete search history.

(56) References Cited

U.S. PATENT DOCUMENTS

| | | |
|---|---|---|
| 3,082,637 A | 3/1963 | Paxton |
| 5,026,329 A | 6/1991 | Diekevers |
| 5,766,106 A | 6/1998 | Edwards |
| 5,935,034 A | 8/1999 | Campagnolo |
| 5,954,604 A * | 9/1999 | Nakamura ..................... 474/160 |
| 6,039,665 A | 3/2000 | Nakamura |

(Continued)

FOREIGN PATENT DOCUMENTS

| | | |
|---|---|---|
| DE | 4401272 | 3/1995 |
| DE | 29623258 U1 | 3/1998 |

(Continued)

OTHER PUBLICATIONS

European Search Report—Extended—EP08005988.4-2421.

(Continued)

*Primary Examiner* — Sang Kim
*Assistant Examiner* — Juan Campos, Jr.
(74) *Attorney, Agent, or Firm* — Volpe and Koenig, P.C.

(57) ABSTRACT

A set of sprockets has a first sprocket with a greater diameter, at least one second sprocket with a smaller diameter and one or more spacer elements operatively arranged between, and in abutment with the sprockets. At least one of the aforementioned sprockets and spacer elements has engagement portions with a freewheel body of a hub of a bicycle rear wheel, the engagement portions defining an ideal circumference for coupling with the freewheel body. The first sprocket rests against the second sprocket, through at least one of the one or more spacer elements, at at least one first contact point arranged at a first radial distance with respect to a longitudinal rotation axis, and at least one second contact point arranged at a second radial distance from the longitudinal rotation axis. The radial distance between the first contact point and the second contact point is at least equal to ⅓ of the radial extension between the circumference and a radially outer end of the second sprocket.

44 Claims, 25 Drawing Sheets

(56) References Cited

U.S. PATENT DOCUMENTS

| | | | |
|---|---|---|---|
| 6,102,281 A | 8/2000 | Lafferty et al. | |
| 6,102,821 A * | 8/2000 | Nakamura | 474/160 |
| 6,176,798 B1 | 1/2001 | Nakamura | |
| 6,382,381 B1 | 5/2002 | Okajima et al. | |
| 6,428,437 B1 * | 8/2002 | Schlanger | 474/160 |
| 7,118,505 B2 * | 10/2006 | Lee | 474/160 |
| 7,344,463 B2 * | 3/2008 | Reiter | 474/160 |
| 7,854,673 B2 | 12/2010 | Oseto et al. | |
| 7,871,347 B2 * | 1/2011 | Kamada | 474/160 |
| 7,931,553 B2 | 4/2011 | Tokuyama | |
| 8,057,338 B2 * | 11/2011 | Kamada | 474/160 |
| 2001/0039224 A1 * | 11/2001 | Lim et al. | 474/160 |
| 2003/0171180 A1 | 9/2003 | Shahana et al. | |
| 2004/0121867 A1 * | 6/2004 | Reiter | 474/160 |
| 2005/0218623 A1 | 10/2005 | Oishi et al. | |
| 2006/0063624 A1 | 3/2006 | Voss | |
| 2006/0172840 A1 * | 8/2006 | Kamada | 474/152 |
| 2006/0231366 A1 | 10/2006 | Meggiolan | |
| 2006/0258499 A1 * | 11/2006 | Kamada | 474/160 |
| 2007/0129193 A1 | 6/2007 | Nonoshita et al. | |
| 2008/0004143 A1 * | 1/2008 | Kanehisa et al. | 474/160 |
| 2008/0058144 A1 | 3/2008 | Oseto et al. | |
| 2009/0042681 A1 | 2/2009 | Dal Pra'et al. | |
| 2009/0042682 A1 | 2/2009 | Dal Pra'et al. | |
| 2011/0092327 A1 * | 4/2011 | Oishi | 474/160 |

FOREIGN PATENT DOCUMENTS

| | | |
|---|---|---|
| DE | 202004019270 | 4/2005 |
| DE | 102007010456 | 12/2007 |
| DE | 19629602 A1 | 4/2012 |
| EP | 0012568 | 6/1980 |
| EP | 0012568 A1 | 6/1980 |
| EP | 0561380 A1 | 9/1993 |
| EP | 0765802 | 4/1997 |
| EP | 0765802 A2 | 4/1997 |
| EP | 1043221 | 10/2000 |
| EP | 1422134 A2 | 5/2004 |
| EP | 1431172 | 6/2004 |
| EP | 1688345 | 8/2006 |
| EP | 1721823 A2 | 11/2006 |
| EP | 2022713 | 2/2009 |
| FR | 910359 | 6/1946 |
| FR | 989114 | 9/1951 |
| GB | 1582793 | 1/1981 |
| JP | 52-154853 | 5/1951 |
| JP | S55-085992 | 6/1980 |
| JP | 09-095285 A | 4/1997 |
| TW | 522972 Y | 3/2003 |
| TW | 590954 B | 6/2004 |
| TW | 590955 B | 6/2004 |
| TW | M274314 Y | 9/2005 |
| TW | I252829 B | 4/2006 |

OTHER PUBLICATIONS

European Search Report—EP 08005988.4-2421.
European Search Report, Appl. No. EP 08005991.8, dated Mar. 6, 2009.
European Search Report, Appl. No. EP 08005988.4, dated Mar. 3, 2009.
European Search Report, Appl. No. EP 08005988.4, dated Jul. 24, 2009.
European Search Report, Appln. No. EP 08005989.2—1254 / 2022713, dated Mar. 28, 2012.
Japanese Office Action issued Mar. 12, 2013 and English Translation.
Search Report and English Translation of Office Action for Taiwan Patent Application No. 097129118 dated Oct. 23, 2013.
Japanese Office Action for Application No. 2008-205178, with English translation, issued Aug. 13, 2013.

* cited by examiner

Figure 22:
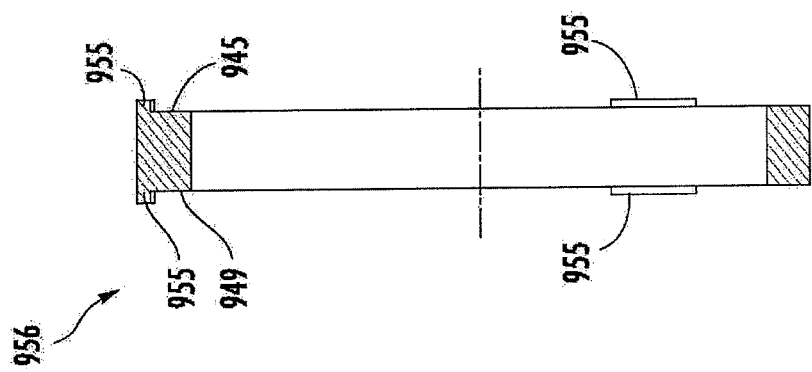
Figure 21:
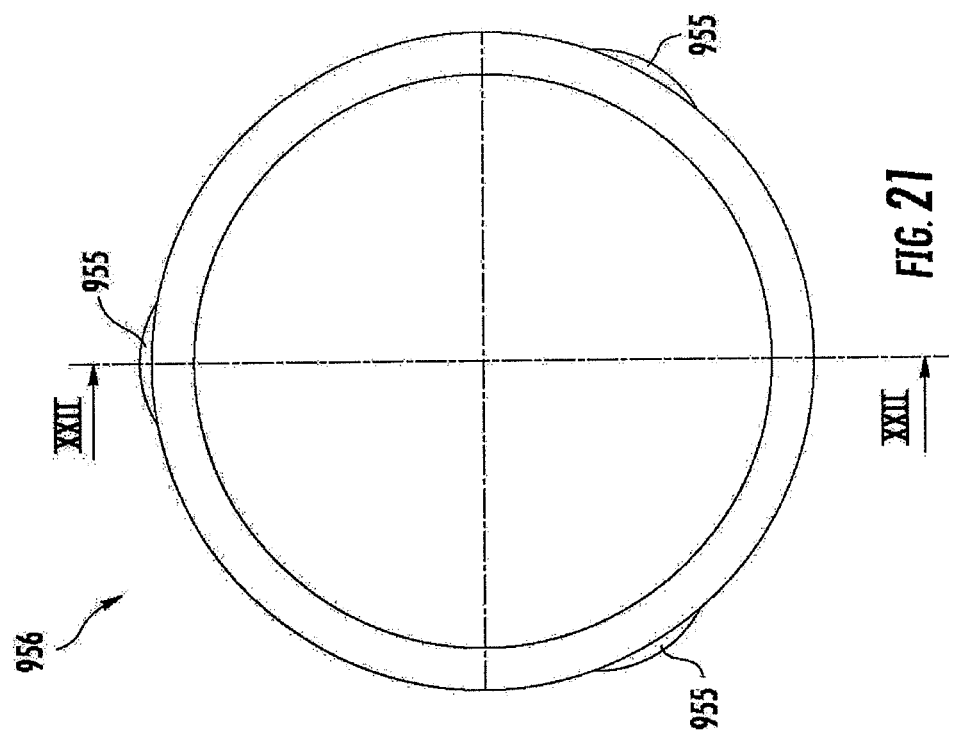

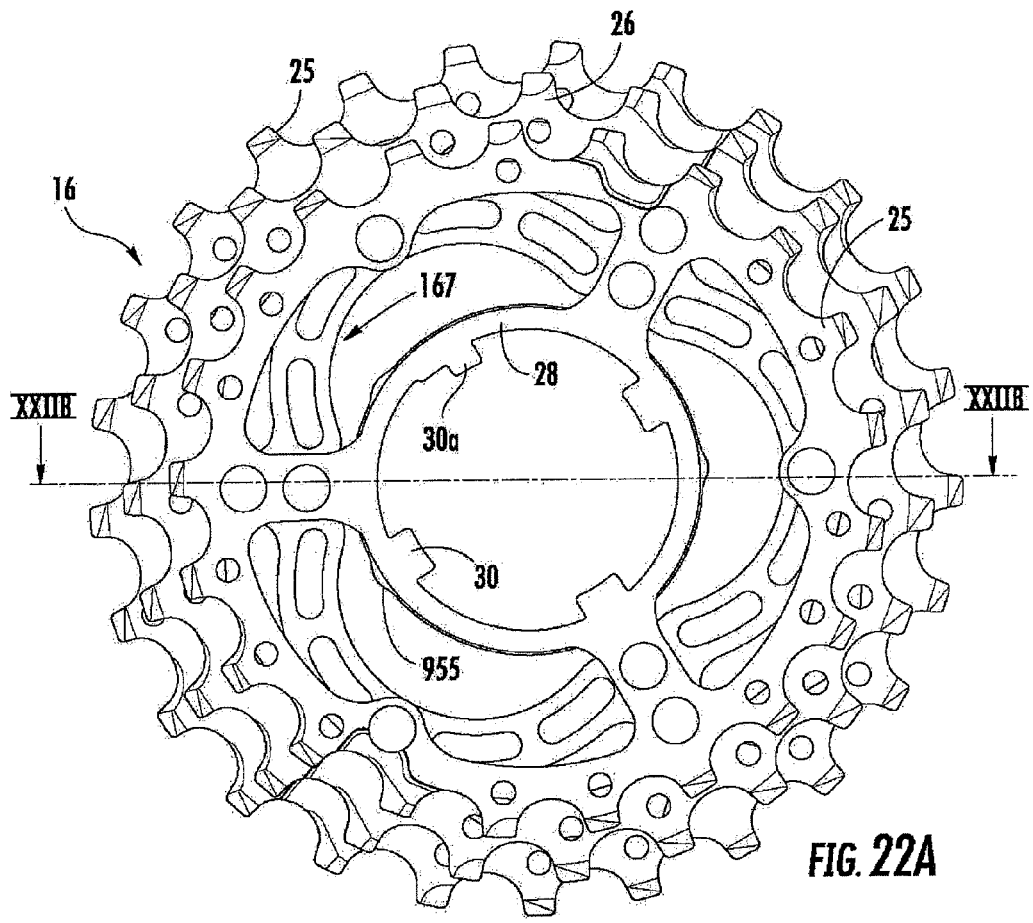
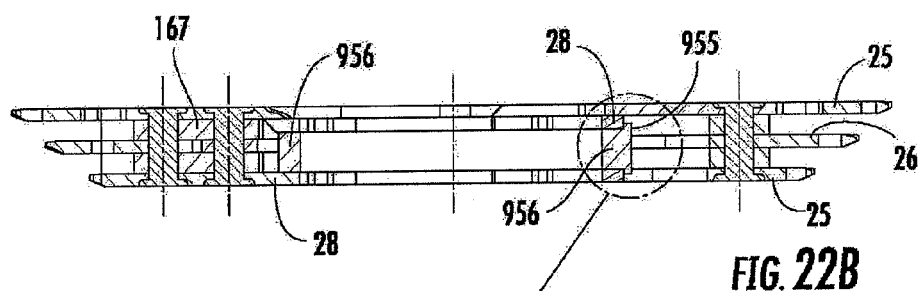
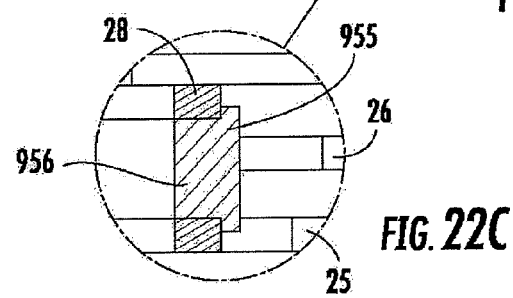
FIG. 22A
FIG. 22B
FIG. 22C

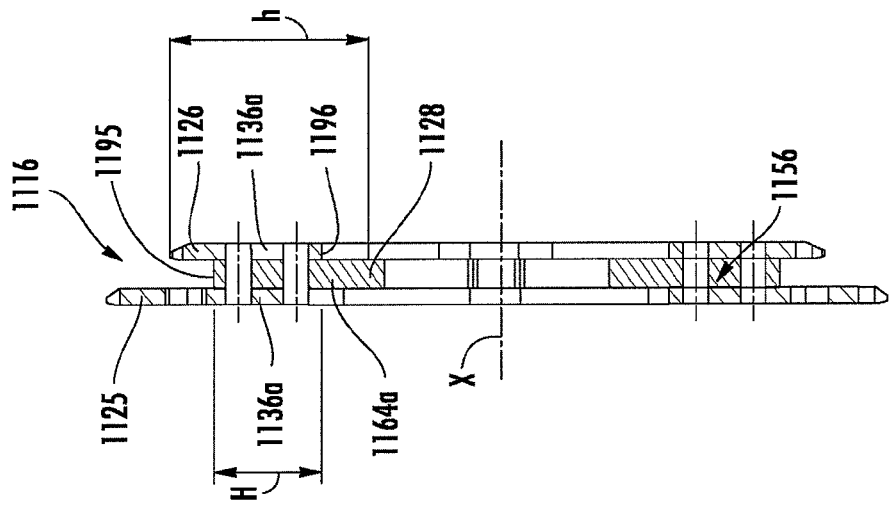
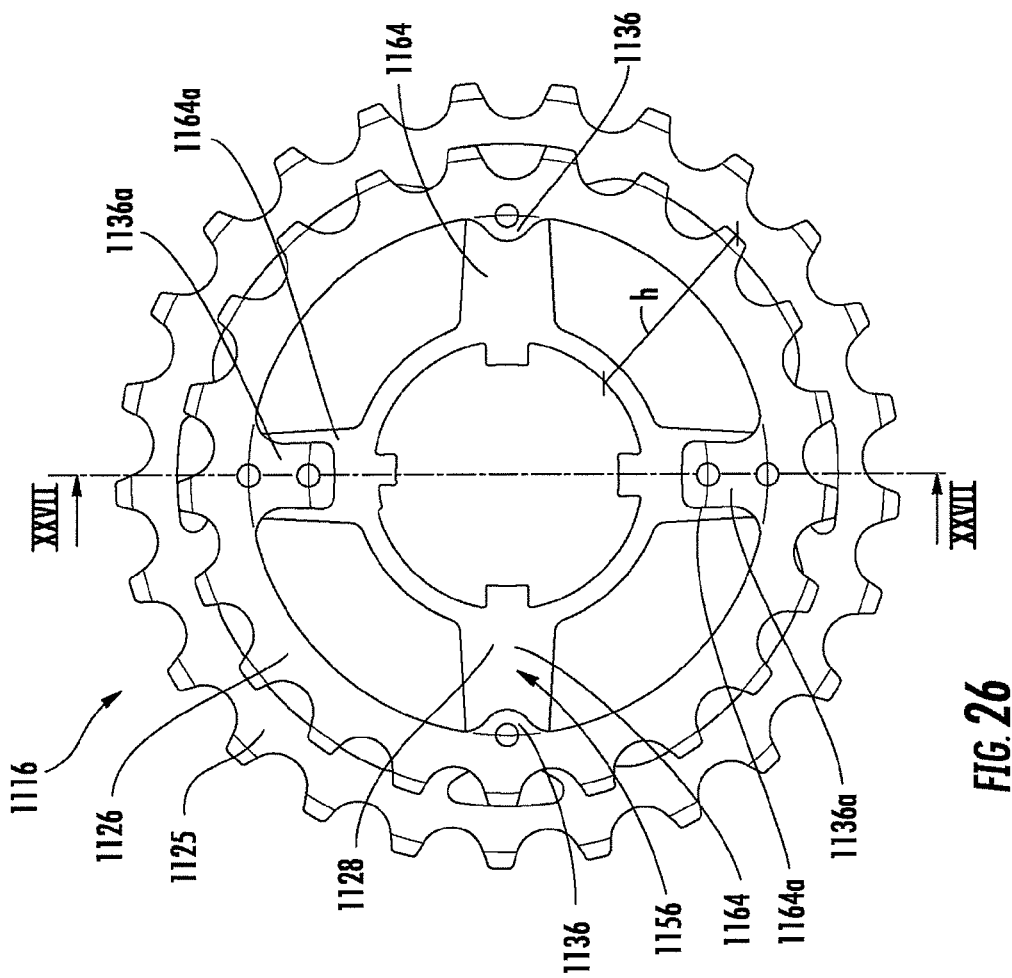

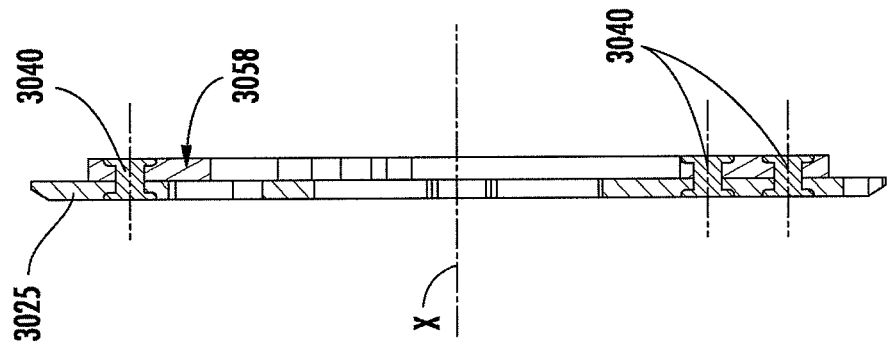
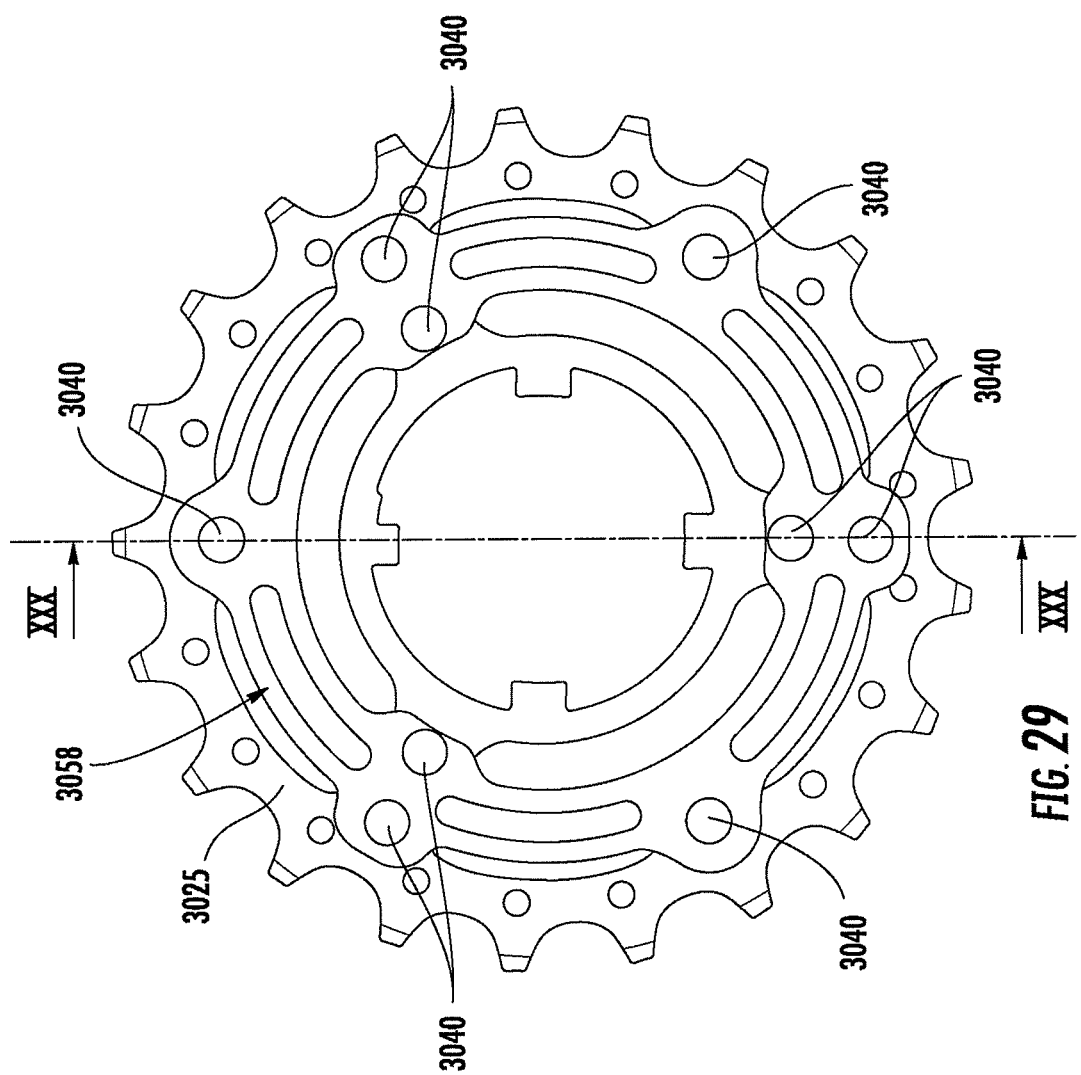

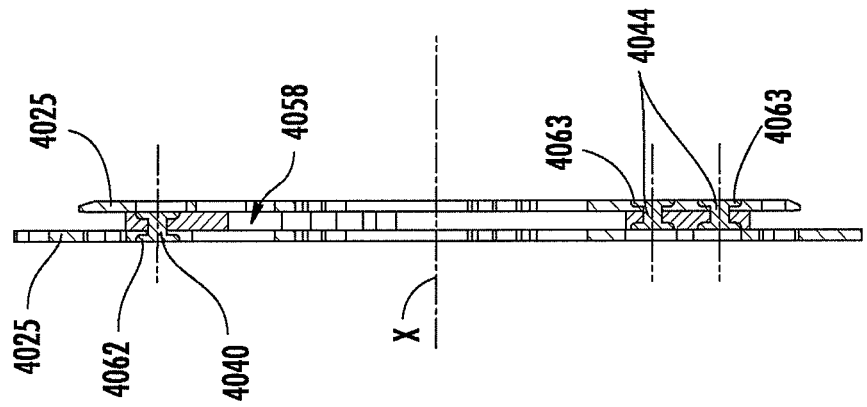
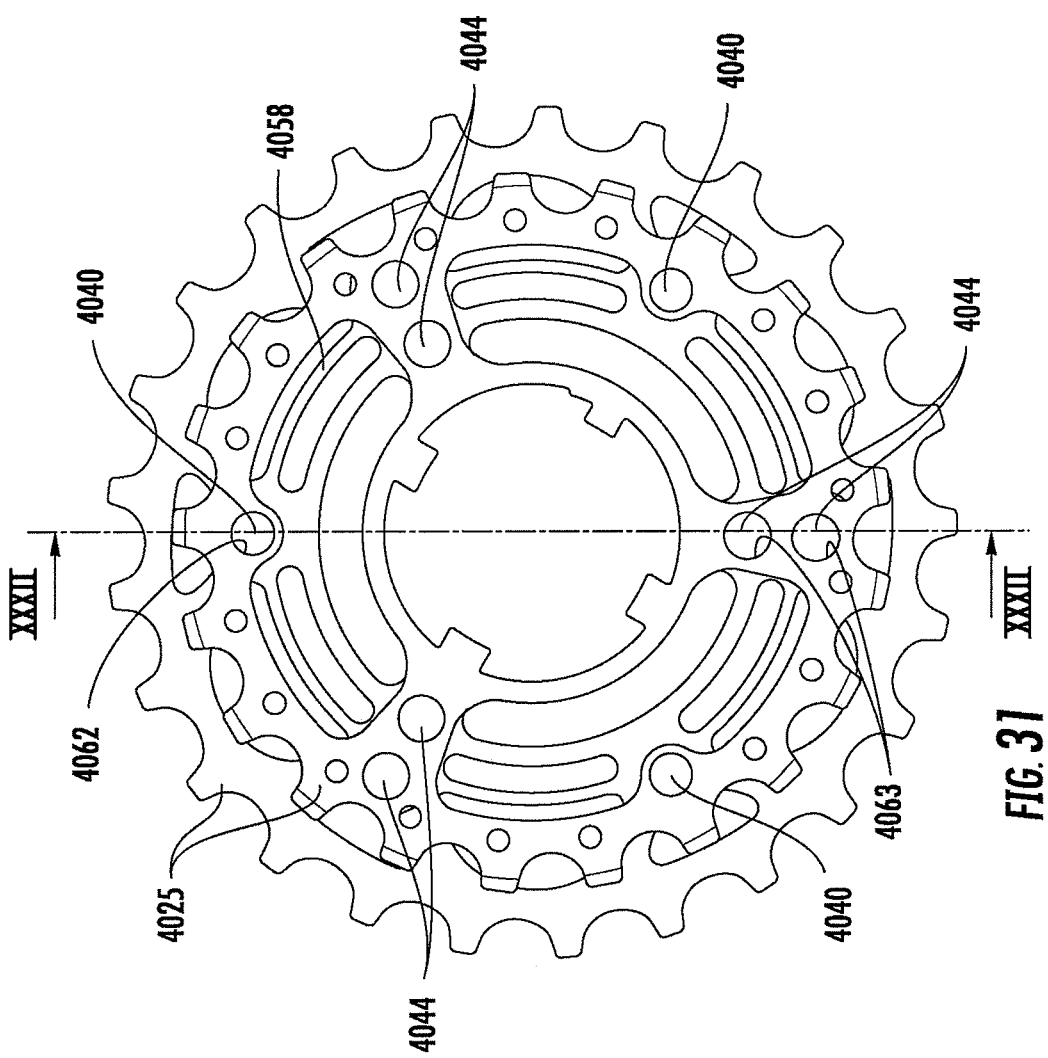

SET OF SPROCKETS FOR A BICYCLE REAR WHEEL AND SPROCKET ASSEMBLY COMPRISING SUCH A SET

FIELD OF INVENTION

The field of the invention relates to a set of sprockets for a bicycle rear wheel.

BACKGROUND

A conventional motion transmission system comprises, in the rear part of the bicycle, a wheel equipped with a hub comprising a body element, in the jargon known as "freewheel body", capable of rotating idly with respect to the hub in one direction of rotation and of making it rotate in the opposite direction.

The freewheel body is generally cylindrical with outer grooves adapted to engage a plurality of sprockets of different diameter forming part of a so-called sprocket assembly. In particular, the sprockets are mounted by arranging substantially annular spacer elements between them. Such spacer elements are fitted onto the freewheel body and are active at the radially inner end portions of the sprockets.

The sprockets are in turn, from time to time, according to the transmission ratio selected by the cyclist, engaged and made to rotate by a chain, which receives the movement from at least one guide toothed wheel associated with a crank arm.

Whereas the spacer elements are often made from light metallic material (for example aluminum) or composite material (for example comprising structural fibers incorporated in a matrix of polymeric material), the sprockets are often made from an extremely strong and consequently heavy material, like steel or titanium, to withstand the wear of the chain and the loads to which they are subjected in operation.

Consequently, due to the weight of the aforementioned sprockets, the weight of the sprocket assembly is generally high.

Some known sprocket assemblies have sprocket support elements made from light material, a sprocket being coupled at opposite sides to each of the sprocket support elements. The two sprockets supported by each support element are in abutment with opposite contact areas of the support element. Such contact areas are arranged at a predetermined radial distance with respect to a longitudinal rotation axis of the freewheel body.

In this sprocket assembly, the sprockets are substantially circular crown shaped and are not coupled with the aforementioned freewheel body. The support elements comprise a substantially annular portion, provided with a radially inner toothing adapted to engage the grooves of the freewheel body of the hub. Such support elements are made from light material, like aluminum.

SUMMARY

Throughout the present description and in the subsequent claims, the expression "set of sprockets" is used to indicate a structural unit comprising at least one first sprocket with a larger diameter, at least one second sprocket with a smaller diameter and at least one spacer element operatively arranged between, and in abutment with, the at least one first sprocket and the at least one second sprocket.

A set of sprockets for a bicycle rear wheel, comprises a first sprocket with a larger diameter, at least one second sprocket with a smaller diameter and one or more spacer elements operatively arranged between, and in abutment with, the first sprocket and the at least one second sprocket, wherein at least one of the first sprocket, at least one second sprocket and one or more spacer elements comprises engagement portions with a freewheel body of a hub of a bicycle rear wheel, the engagement portions defining an ideal circumference for coupling with the freewheel body, the first sprocket resting against the at least one second sprocket, through at least one of the one or more spacer elements, at least one first contact point arranged at a first radial distance with respect to a longitudinal rotation axis (X), wherein the first sprocket also rests against the at least one second sprocket, through at least one of the one or more spacer elements, at least one second contact point defined at a second radial distance from the longitudinal rotation axis (X) different from the first radial distance, the radial distance (H) between the at least one first contact point and the at least one second contact point being at least equal to ⅓ of the radial extension (h) between the ideal circumference and a radially outer end of the at least one second sprocket.

BRIEF DESCRIPTION OF THE DRAWING(S)

Figure 1:
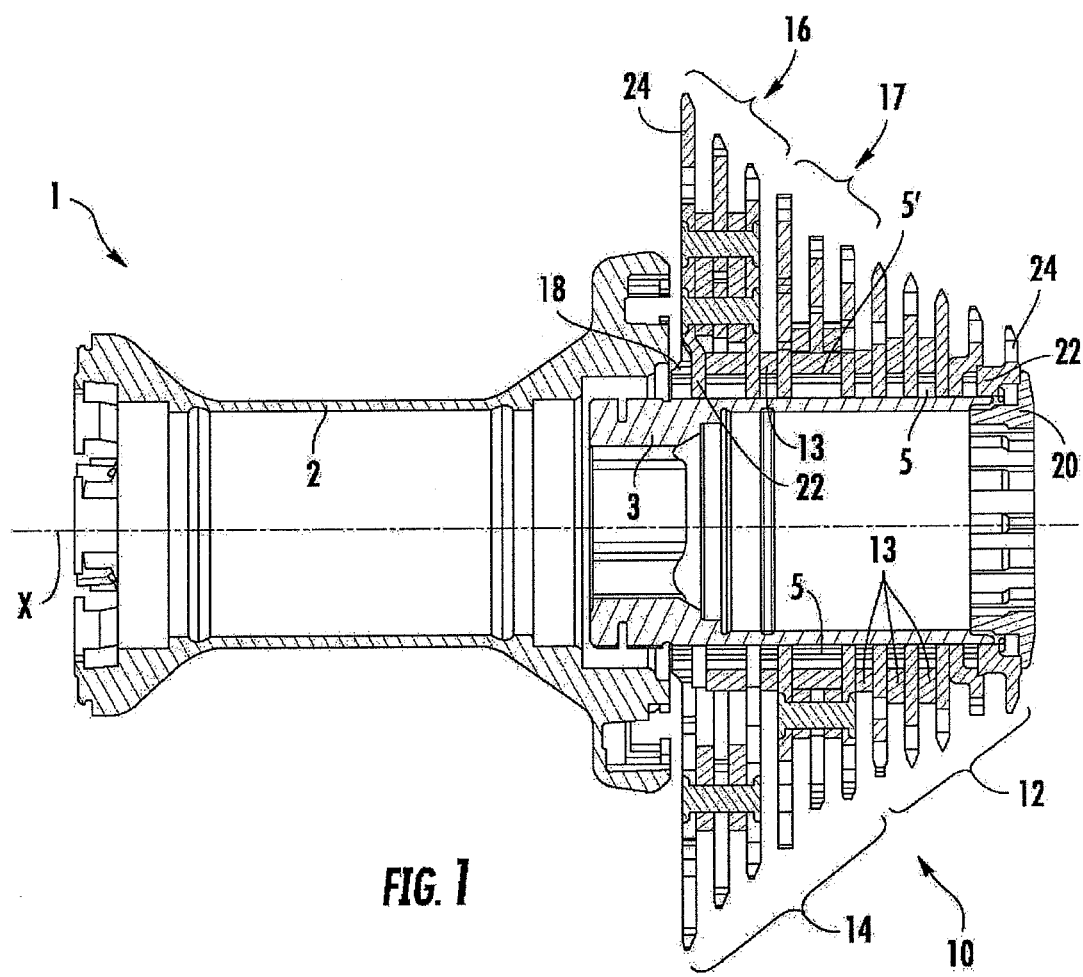
Figure 3:
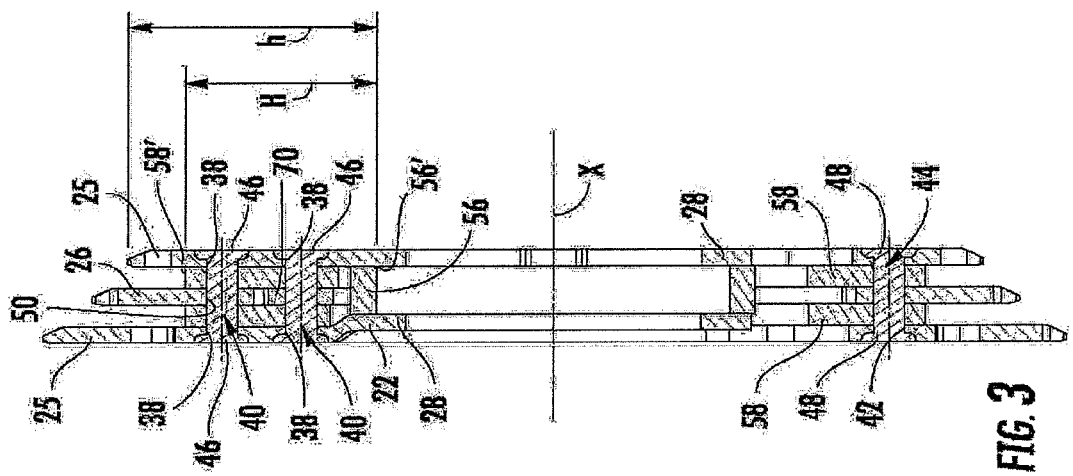
Figure 2:
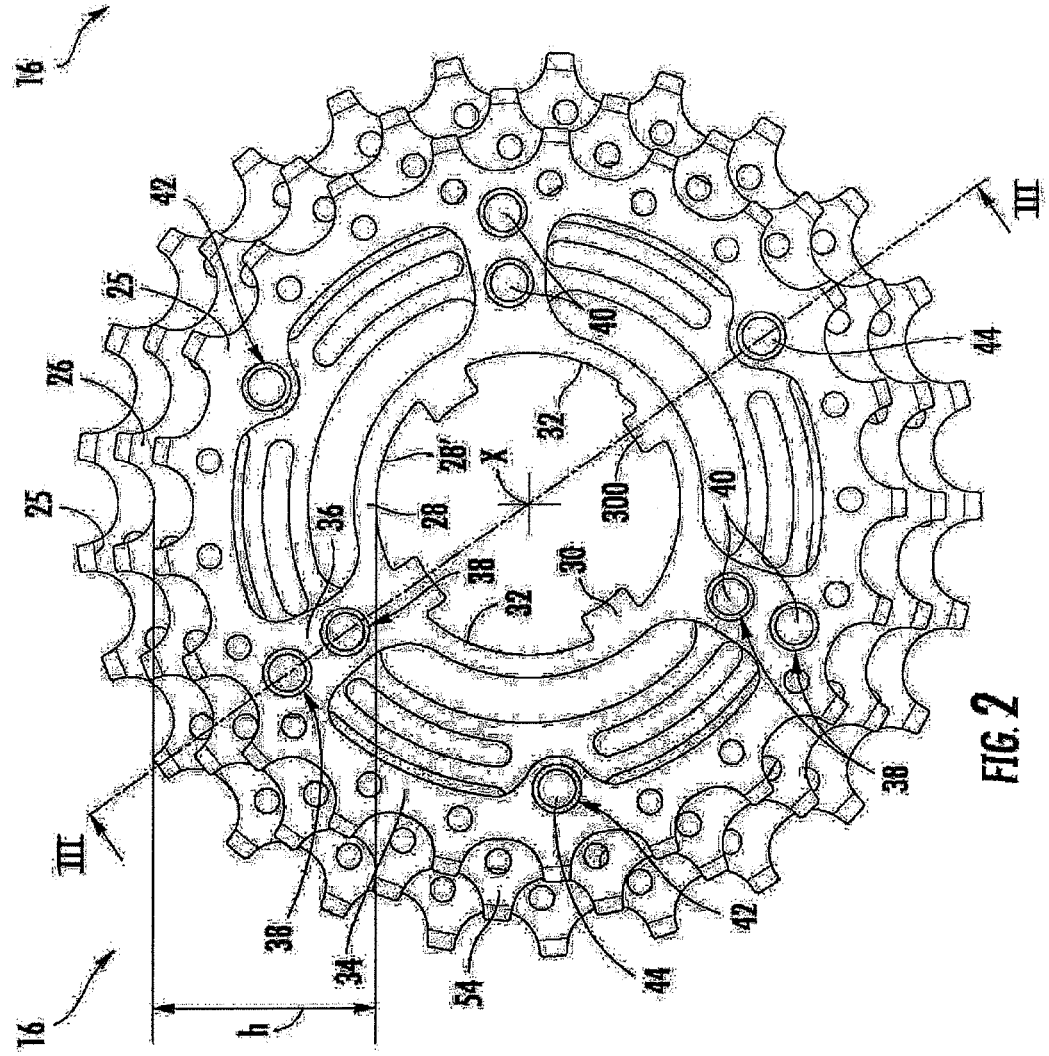
Figure 4:
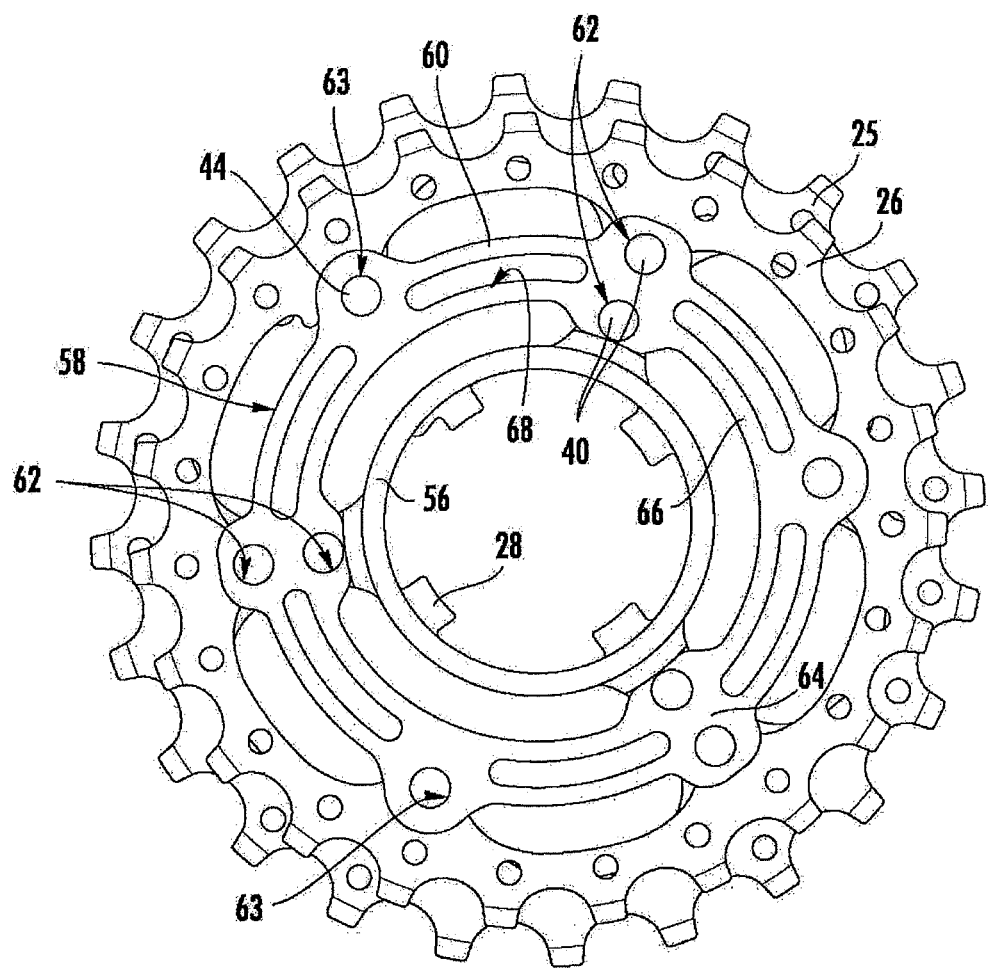
Figure 6:
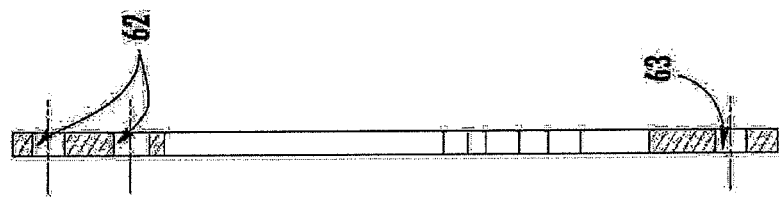
Figure 5:
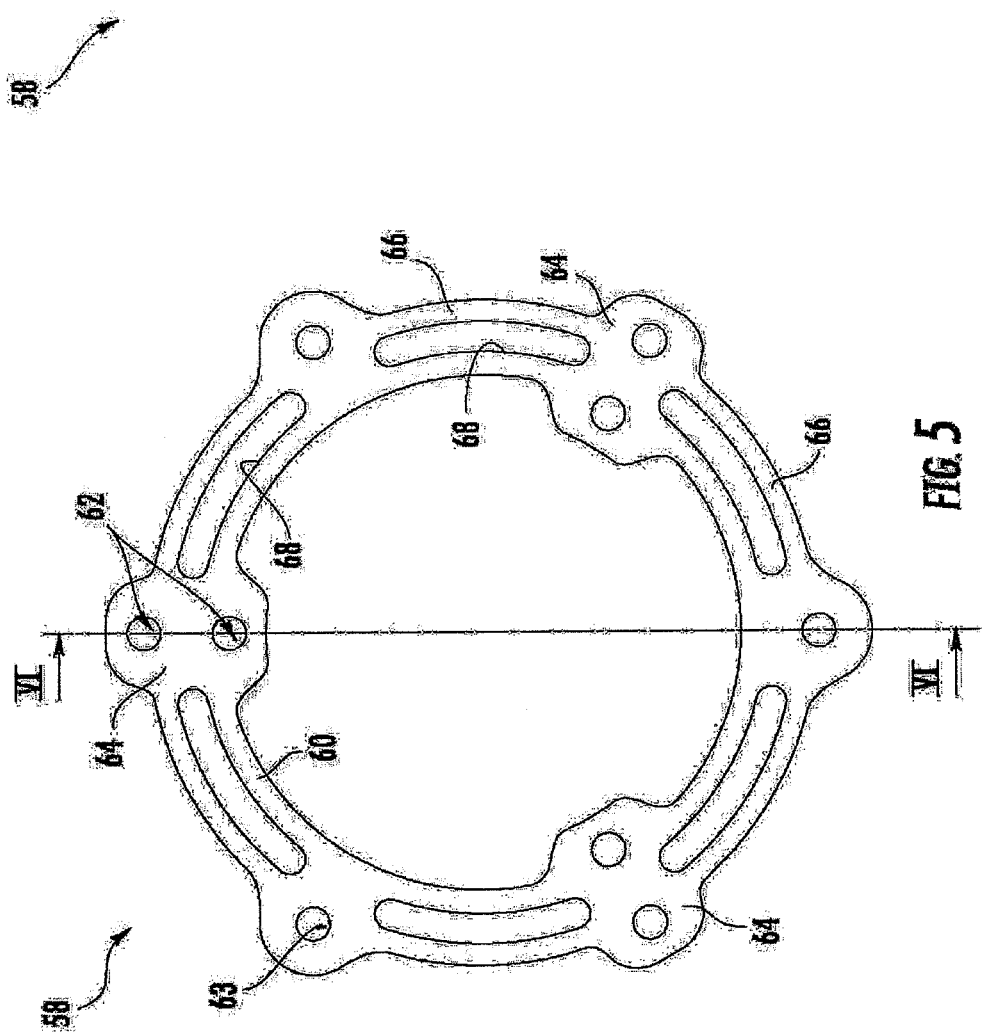
Figure 7:
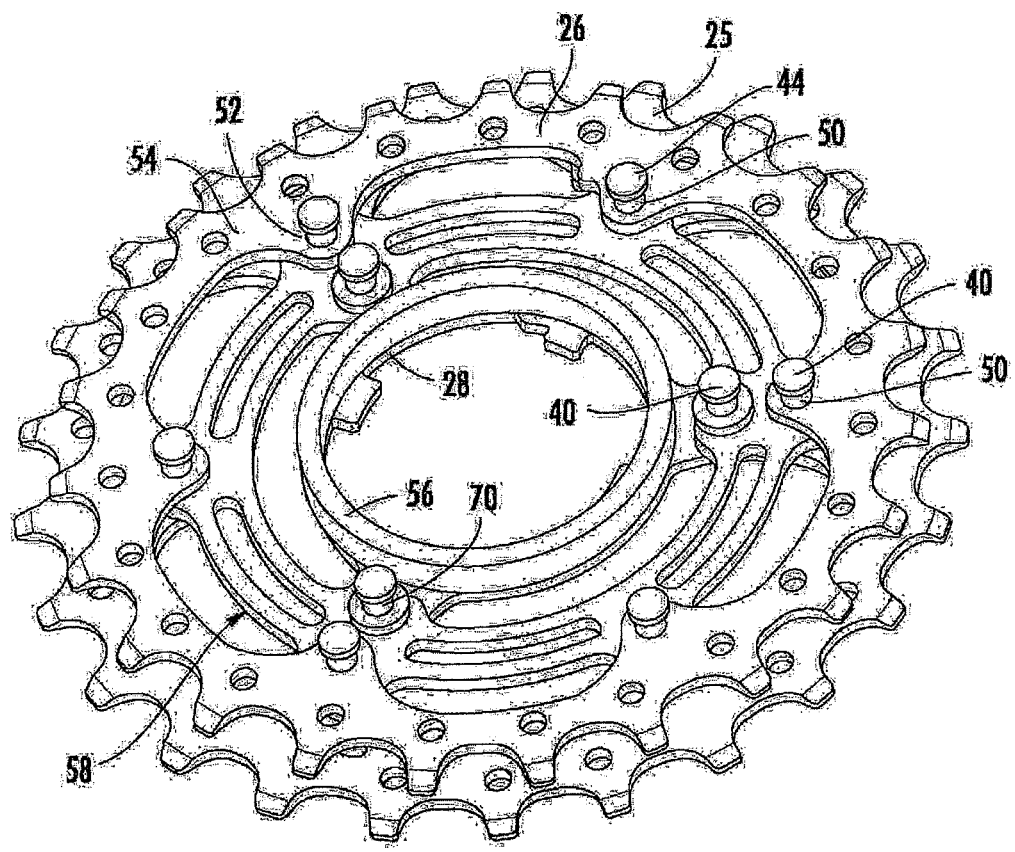
Figures 8, 9:
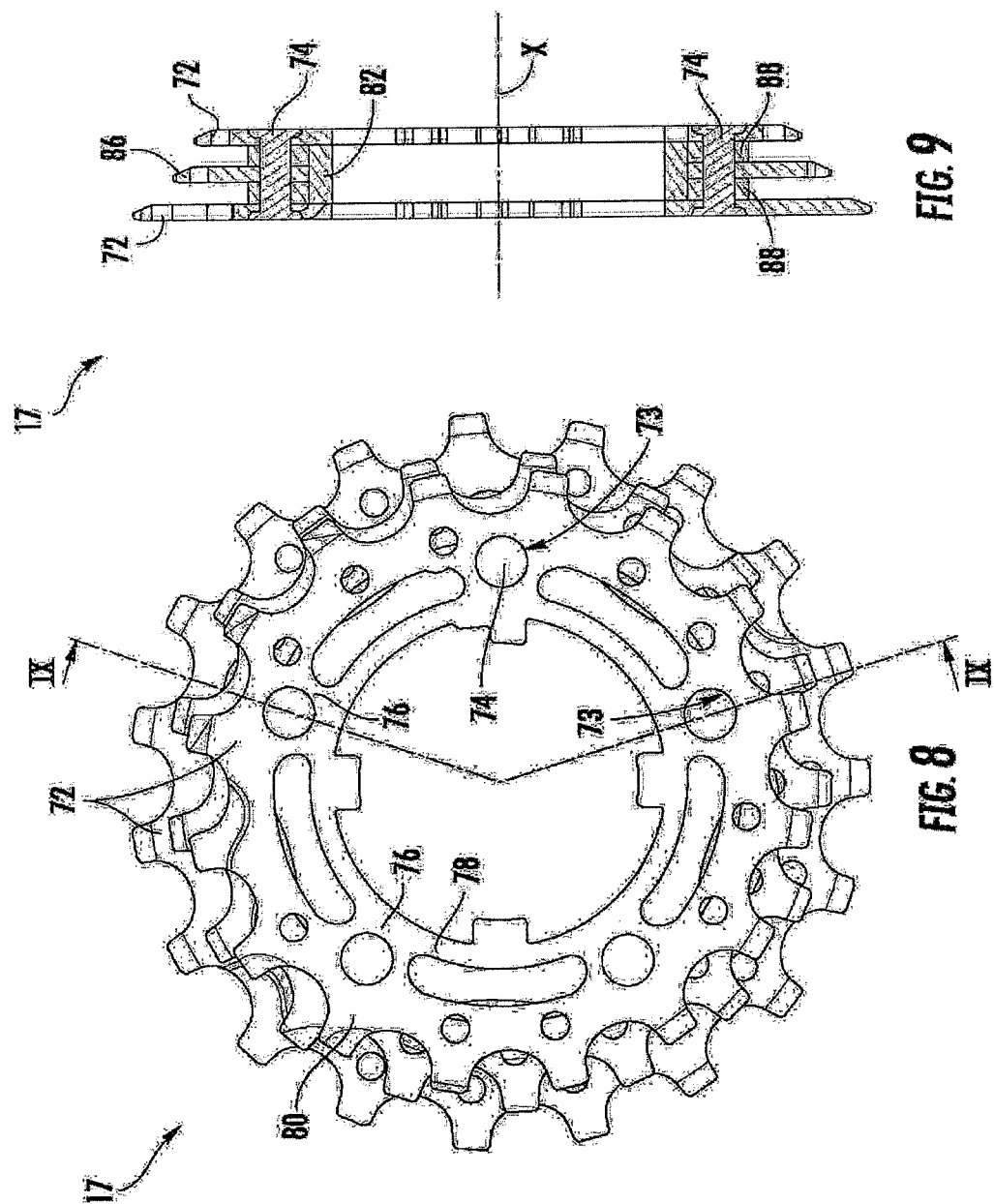
Figure 10:
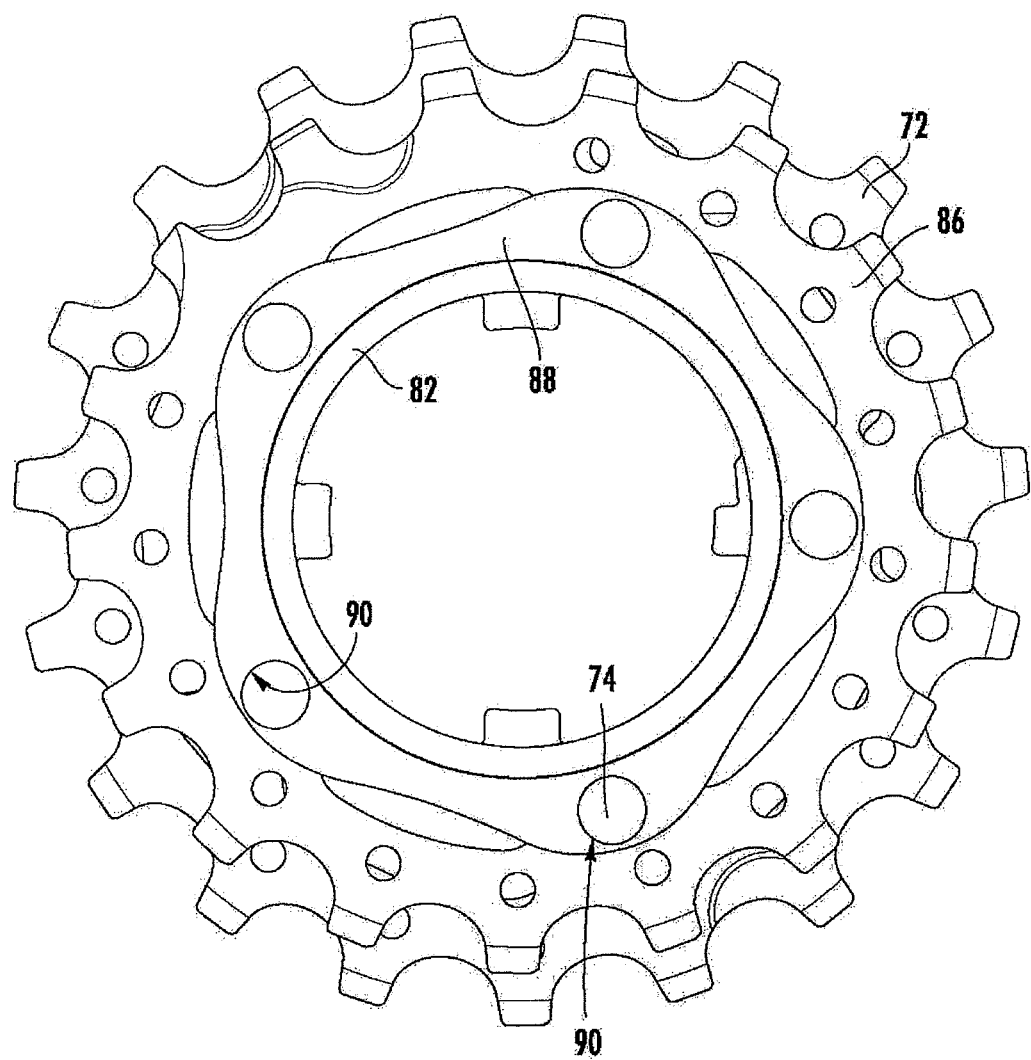
Figure 14:
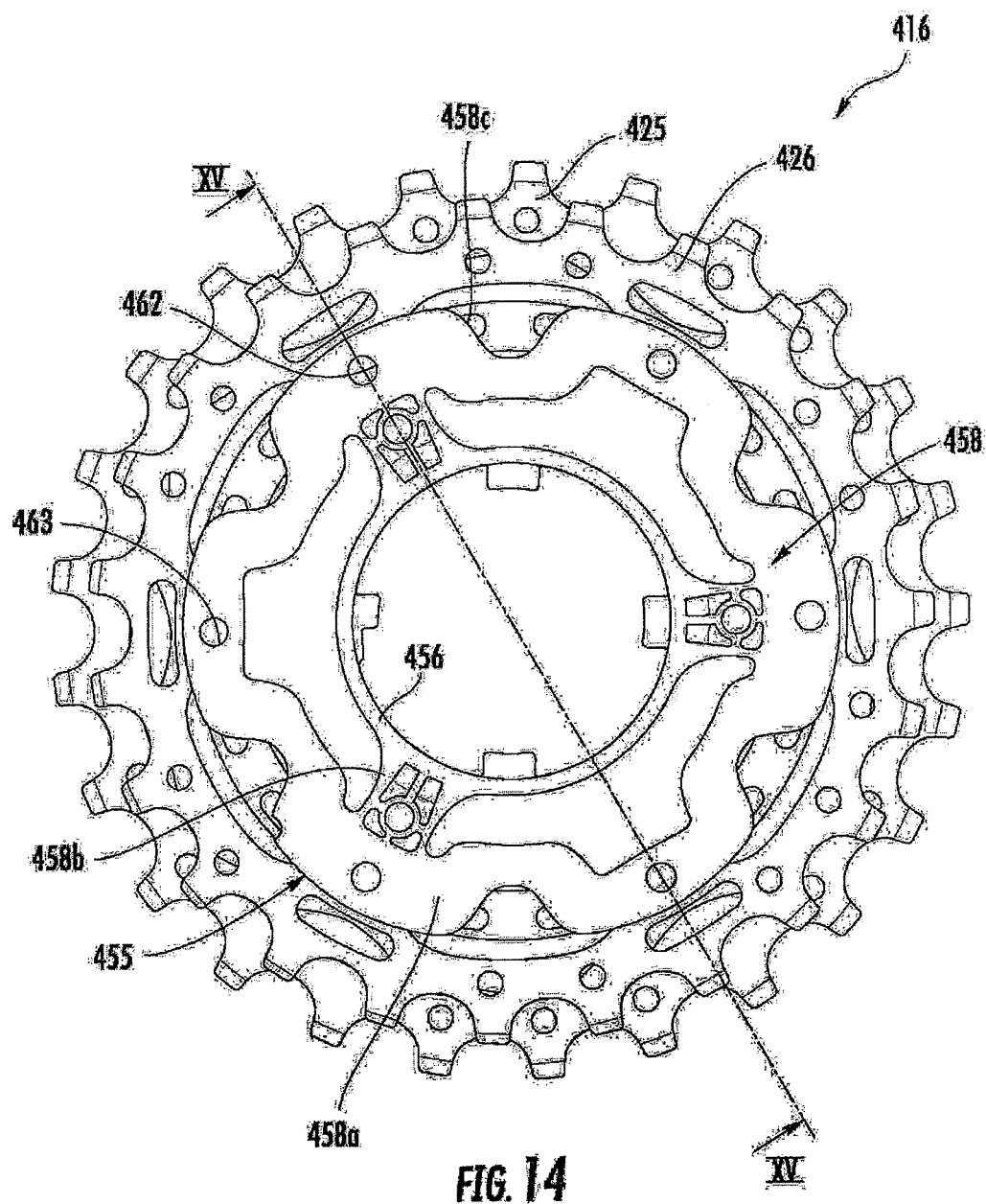
Figure 15:
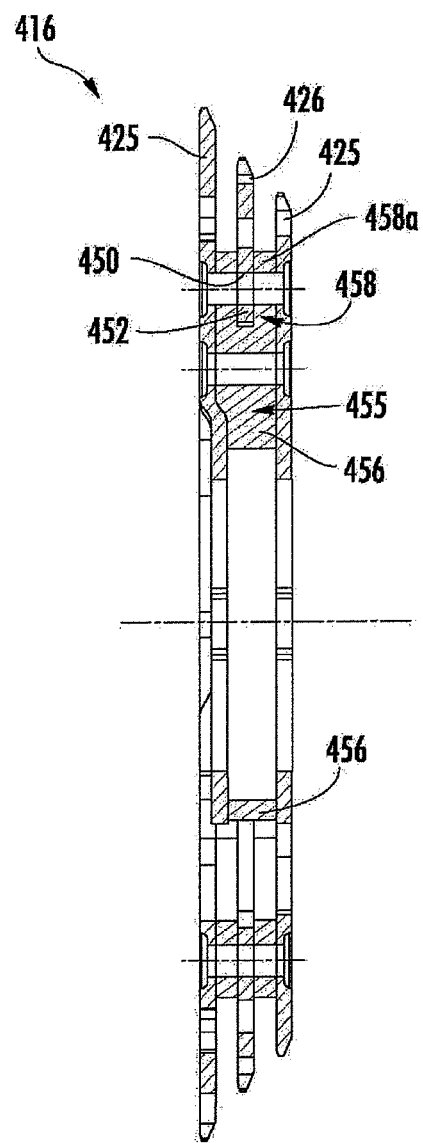
Figure 16:
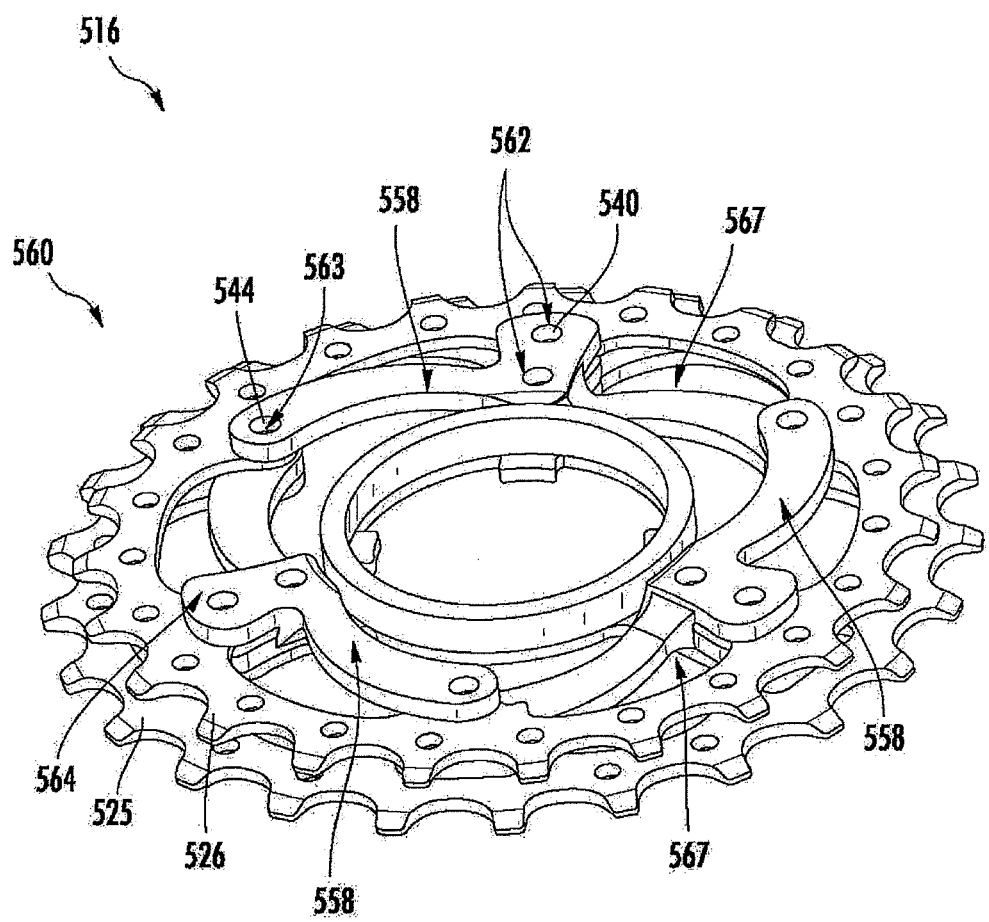
Figure 17:
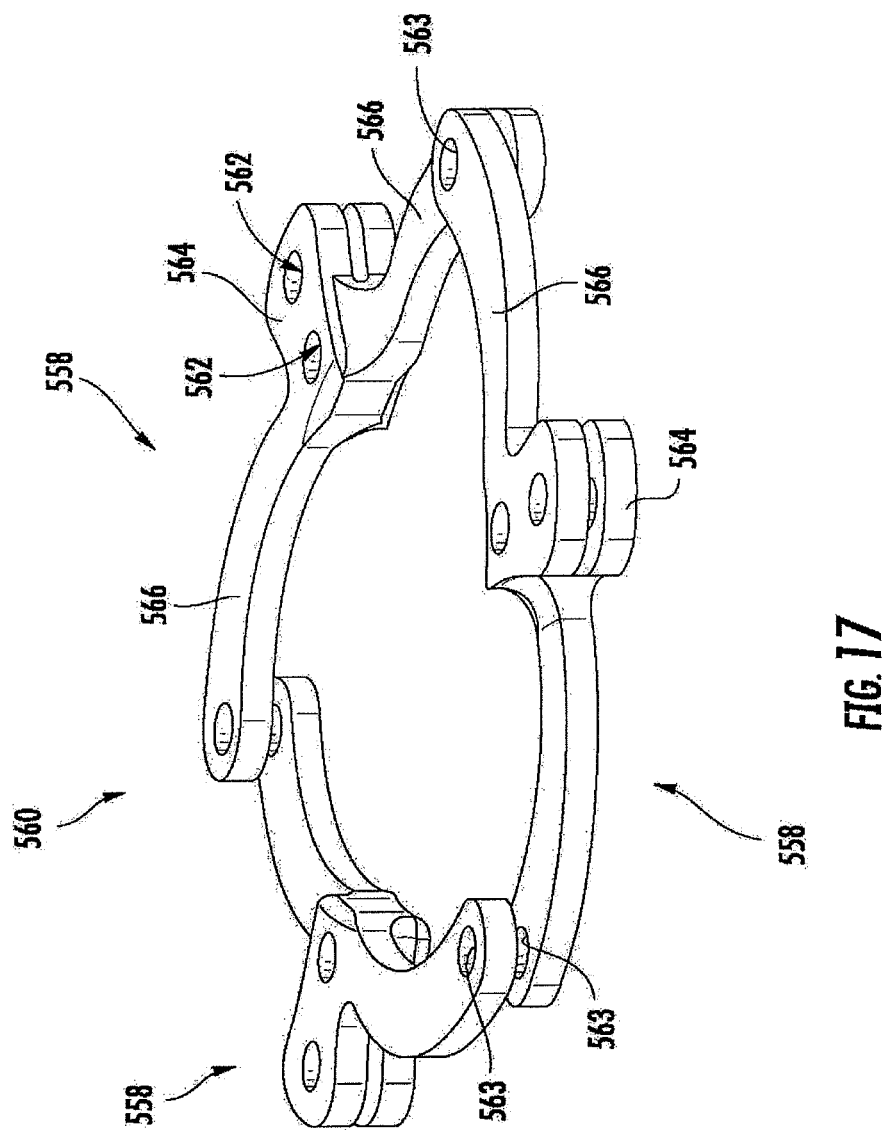
Figure 18:
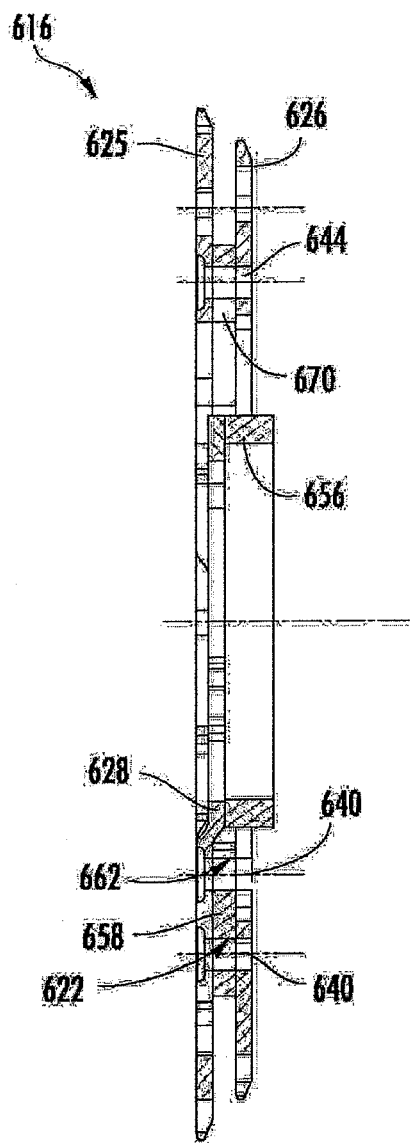
Figure 19:
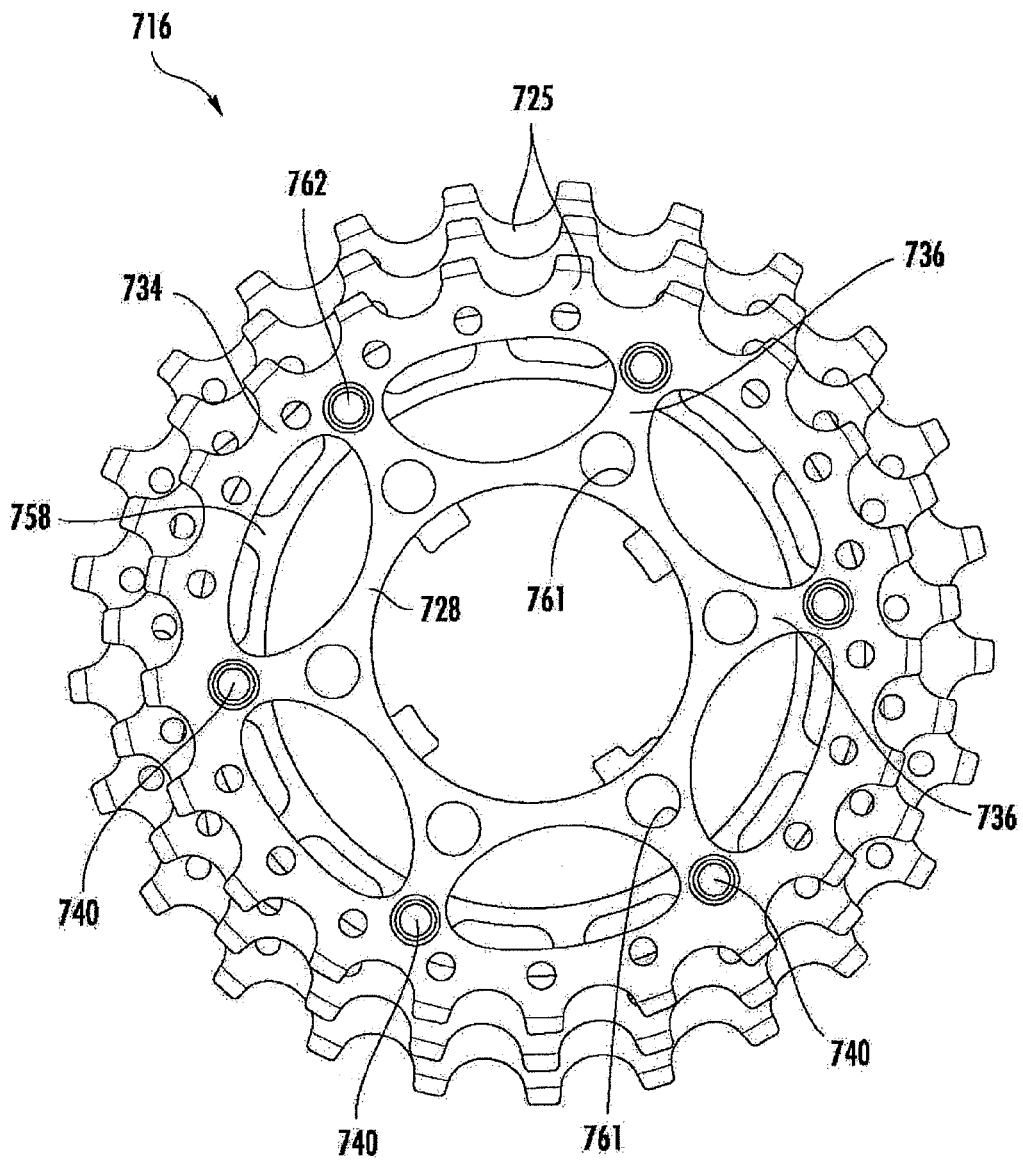
Figure 20:
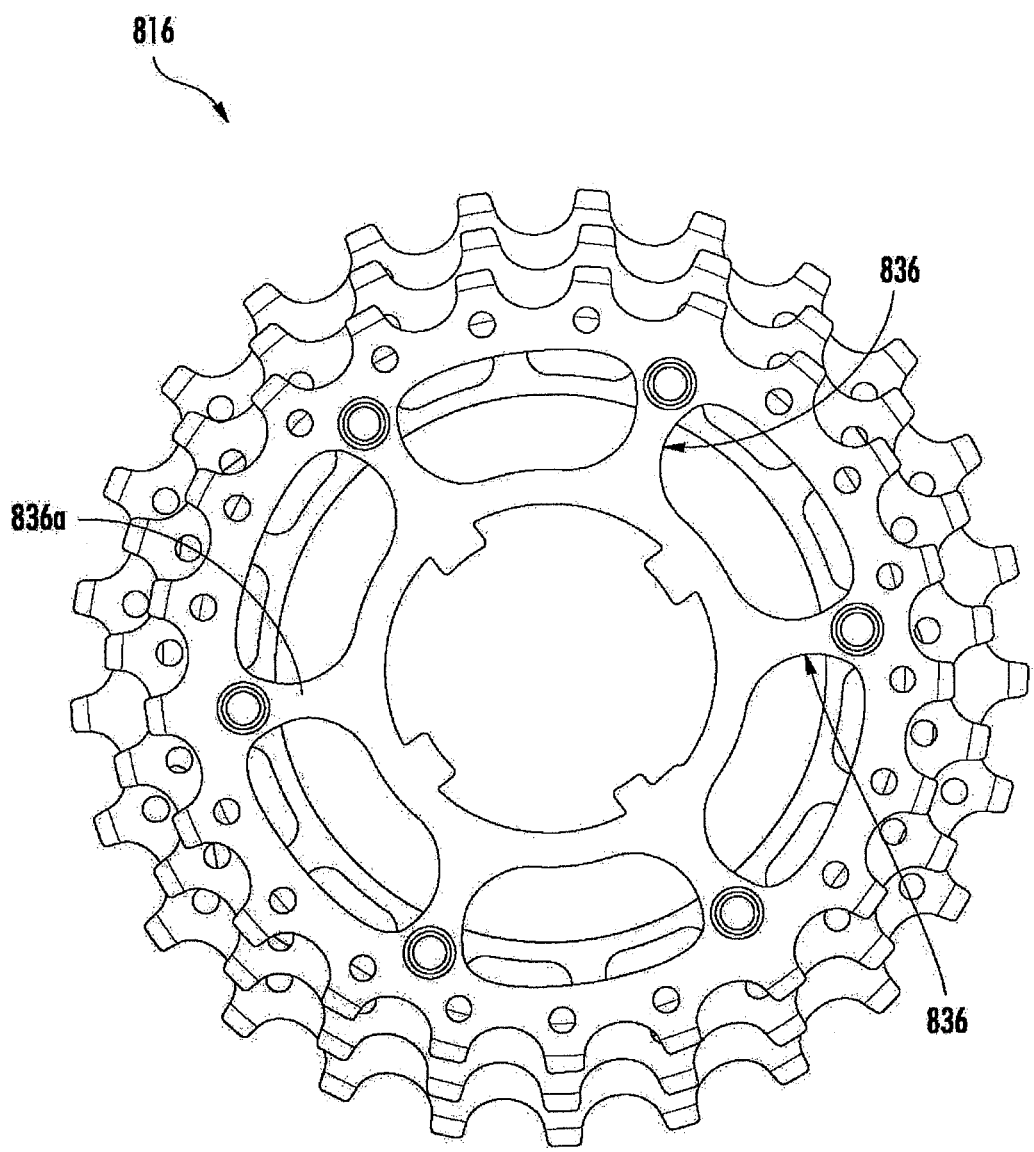
Figure 24:
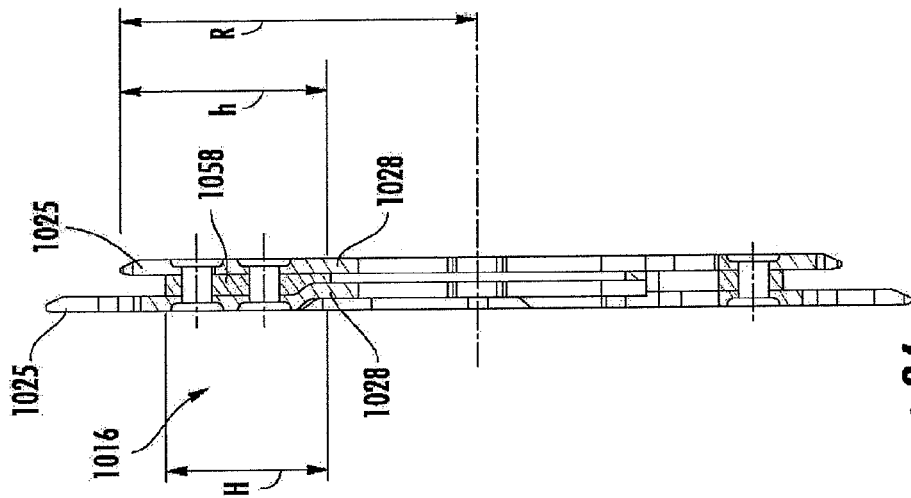
Figure 23:
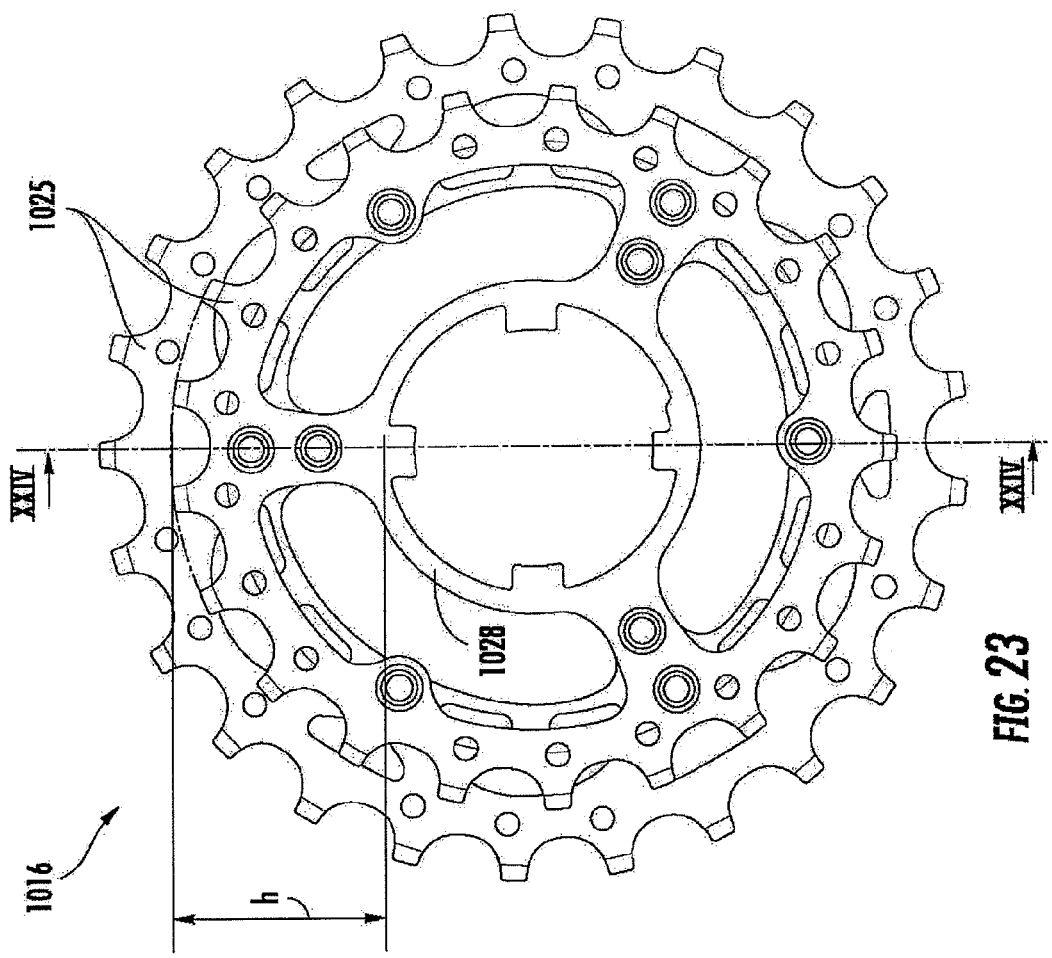
Figure 25:
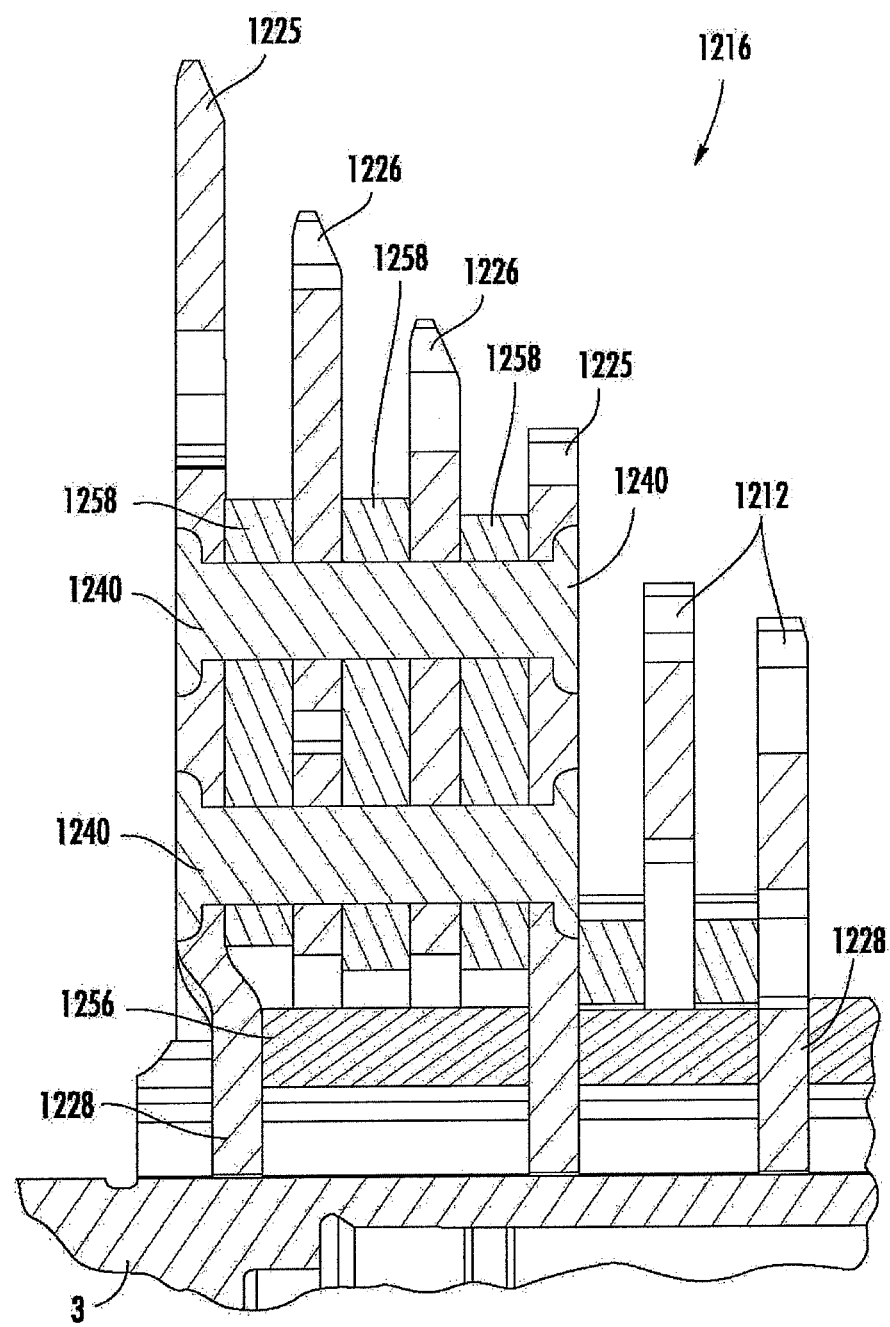
Figure 28:
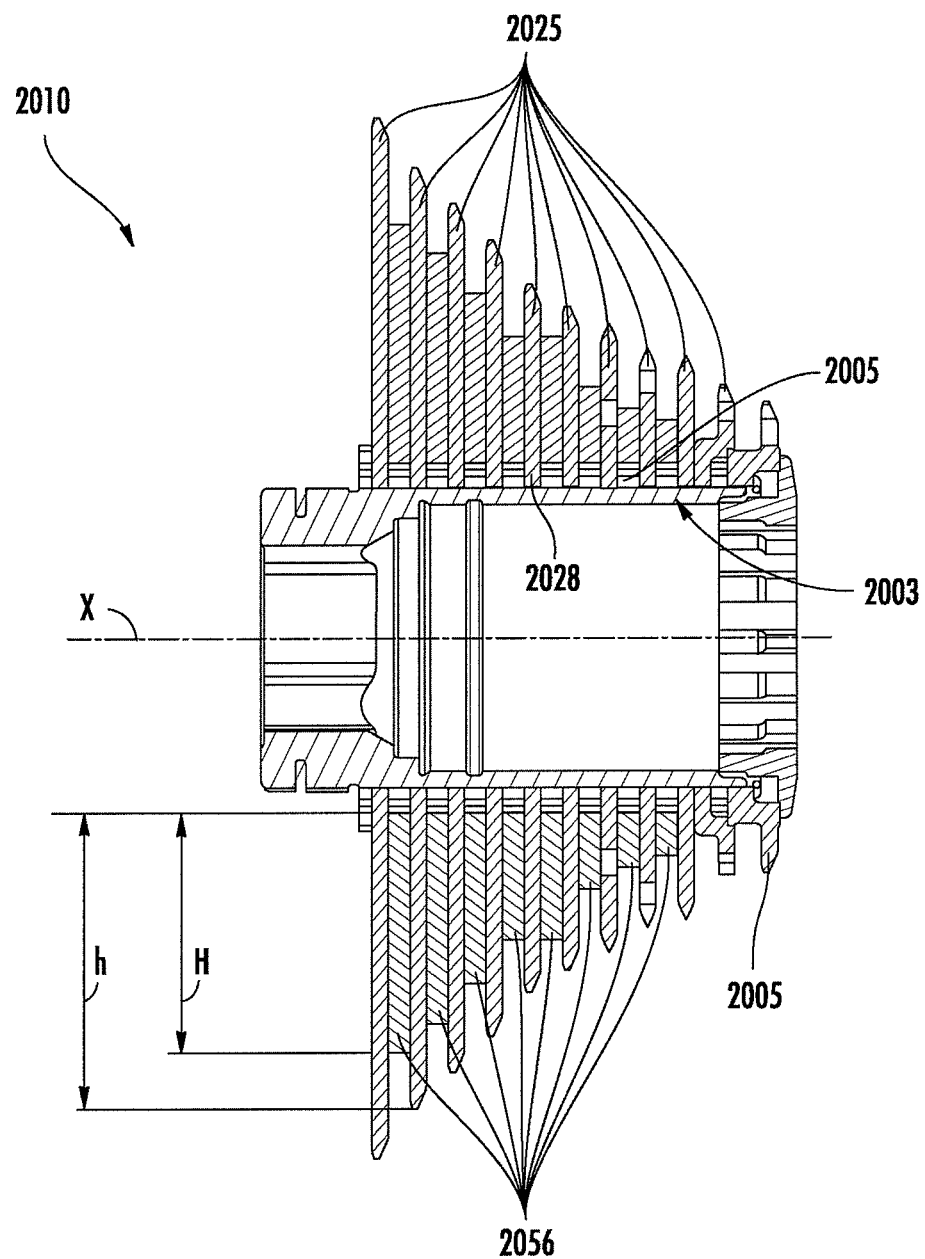

Certain characteristics and advantages shall become clearer from the following detailed description of some preferred embodiments thereof, made with reference to the attached drawings, given for indicating and not limiting purposes. In these drawings:

FIG. 1 schematically represents a longitudinal section of a hub for a bicycle rear wheel on which a plurality of sprocket sets is mounted;

FIG. 2 schematically represents a front view of a sprocket set, in particular of the set of FIG. 1 comprising the three sprockets with the largest diameter;

FIG. 3 schematically represents a diametric section of the set of FIG. 2, taken according to the plane traced with the line III-III of FIG. 2;

FIG. 4 schematically represents a front view of the set of FIG. 2 wherein the sprocket with the smallest diameter has been removed, in order to illustrate the parts hidden by it;

FIGS. 5 and 6 schematically represent a front view and a diametric section, taken according to the plane traced with the line VI-VI of FIG. 5, of an annular spacer element of the set of FIG. 2 (the set of FIG. 2 has two of such spacer elements);

FIG. 7 schematically represents a perspective view of the set of FIG. 2 wherein the sprocket with the smallest diameter and one of the two spacer elements have been removed, in order to illustrate the parts hidden by them;

FIGS. 8 and 9 schematically represent a front view and a diametric section, taken according to the plane traced with the line IX-IX of FIG. 8, of a second embodiment of a set, in particular of the set of FIG. 1 next to the set of FIG. 2;

FIG. 10 schematically represents a front view of the set of FIG. 8 wherein the sprocket with the smallest diameter has been removed, in order to illustrate the parts hidden by it;

FIGS. 11, 12, 13 and 14 schematically represent front views of further embodiments of a set wherein the respective sprockets with the smallest diameter have been removed, in order to illustrate the parts hidden by them;

FIG. 15 schematically represents a diametric section view of the set of FIG. 14, taken according to the plane traced with the line XV-XV of FIG. 14;

FIG. 16 schematically represents a perspective view of a further embodiment of a set wherein the sprocket with the smallest diameter has been removed, in order to illustrate the parts hidden by it;

FIG. 17 schematically represents a perspective view of the spacer elements of the set of FIG. 16 in a relative configuration identical to that which they have inside the set of FIG. 16;

FIG. 18 schematically represents a diametric section view of an alternative embodiment of a set, in which a sprocket is supported cantilevered;

FIGS. 19 and 20 schematically represent front views of further embodiments of sets;

FIGS. 21 and 22a-c show views and sections of another embodiment showing the cylindrical spacer;

FIGS. 23 and 24 schematically represent a front view and a diametric section, taken according to the plane traced with the line XXIV-XXIV of FIG. 23, of an alternative embodiment of a set;

FIG. 25 schematically represents a diametric section of a further embodiment of a set, comprising four sprockets;

FIGS. 26 and 27 schematically represent a front view and a diametric section, taken according to the plane traced with the line XXVII-XXVII of FIG. 26, of an alternative embodiment of a set of sprocket;

FIG. 28 schematically represents a longitudinal section of a sprocket assembly for a bicycle rear wheel, comprising a plurality of sets of sprockets according a further embodiment;

FIGS. 29 and 30 schematically represent a front view and a diametric section, taken according to the plane traced with the line XXX-XXX of FIG. 29, of a portion of a set of sprockets;

FIGS. 31 and 32 schematically represent a front view and a diametric section, taken according to the plane traced with the line XXXII-XXXII of FIG. 31, of a portion of a set of sprockets.

DETAILED DESCRIPTION OF THE PREFERRED EMBODIMENT(S)

Introduction

The sprockets of the aforementioned sprocket assembly, in order to adequately withstand the bending and twisting stresses imparted by the chain during pedaling, should have a minimum thickness, which sacrifices weight.

The sprocket assembly should be capable of satisfying the requirement of lightness, at the same time ensuring a satisfactory mechanical strength.

The set of sprockets for a bicycle rear wheel, comprises a first sprocket with a larger diameter, at least one second sprocket with a smaller diameter and one or more spacer elements operatively arranged between, and in abutment with, the first sprocket and the at least one second sprocket, wherein at least one of the first sprocket, at least one second sprocket and one or more spacer elements comprises engagement portions with a freewheel body of a hub of a bicycle rear wheel, the engagement portions defining an ideal circumference for coupling with the freewheel body, the first sprocket resting against the at least one second sprocket, through at least one of the one or more spacer elements, at least one first contact point arranged at a first radial distance with respect to a longitudinal rotation axis, wherein the first sprocket also rests against the at least one second sprocket, through at least one of the one or more spacer elements, at least one second contact point defined at a second radial distance from the longitudinal rotation axis that is different to the first radial distance, the radial distance between the at least one first contact point and the at least one second contact point being at least equal to ⅓ of the radial extension between the ideal circumference and a radially outer end of the at least one second sprocket.

The use of a set of sprockets of the type described above makes it possible to manufacture a sprocket assembly that is unusually strong and, at the same time, light. This is thanks to the fact that each sprocket of such an assembly, resting against another sprocket of the assembly through the aforementioned spacer element(s) at two different contact points arranged at a high radial distance apart, has a structural resistance to the deformation caused by the torque imparted by the chain that is increased through the effect of the contribution given by the aforementioned other sprocket. This makes it possible to reduce the thickness of the sprockets, thus obtaining a substantial saving in weight of the sprocket assembly. Moreover, thanks to the reduction in thickness of the sprockets, it is possible to house on the freewheel body of the hub a lager number of sprockets than what is possible in conventional sprocket assemblies, without the need to modify the standardized size of the freewheel body and/or of the bicycle frame.

In particular, by providing a support extending in the radial direction between consecutive sprockets of the sprocket assembly through the spacer elements there is a distribution to the adjacent sprockets of the stresses to which the sprocket engaged by the chain is subjected, to the great advantage of the structural strength of the individual sprockets.

The greater the aforementioned radial distance between the first and second contact point is, the greater is the structural rigidity of each individual sprocket through the effect of the support at the nearby sprockets.

The radial distance between the at least one first contact point and the at least one second contact point is at least equal to ½, and more preferably at least equal to ⅔, of the radial extension between the ideal circumference and the radially outer end of the at least one second sprocket.

The aforementioned at least one second sprocket may have a number of teeth that is greater than or equal to 15, more preferably greater than or equal to 18. The strengthening effect of the sprockets given by the support extending to the adjacent sprockets through the spacer element is advantageous for the larger sprockets of the sprocket assembly, such sprockets being those most subject to the bending and twisting deformations caused by the action of the chain.

In another embodiment of the set of sprockets, the first sprocket rests against the at least one second sprocket, through at least one of the one or more spacer elements, at least one intermediate contact area between the at least one first contact point and the at least one second contact point. In this way, advantageously, the support between the sprockets is increased, giving in this way greater strength to the sprockets themselves.

The first sprocket may rest against the at least one second sprocket, through at least one of the one or more spacer elements, at a surface portion extending between the at least one first contact point and the at least one second contact point. The support between the sprockets in this case takes place at a contact surface with high radial extension. The structural rigidity of each sprocket is thus further increased.

In another embodiment of the set of sprockets, the first sprocket may rest against the at least one second sprocket, through at least one of the one or more spacer elements, at a plurality of contact areas defined in a radially inner annular portion of the at least one second sprocket.

The first sprocket may rest against the at least one second sprocket, through at least one of the one or more spacer elements, along all of the radially inner annular portion of the at least one second sprocket.

The at least one first contact point may be defined in the radially inner annular portion.

In another embodiment of the set of sprockets, the first sprocket may rest against the at least one second sprocket, through at least one of the one or more spacer elements, at a plurality of contact areas arranged in a radially outer annular portion of the at least one second sprocket.

The first sprocket may rest against the at least one second sprocket, through the at least one spacer element, along all of the radially outer annular portion of the at least one second sprocket.

The at least one second contact point may be defined in the radially outer annular portion.

A sprocket may rest against an adjacent sprocket both close to the freewheel body of the hub and to the outer toothing of the sprocket. The strengthening effect of the sprocket is thus maximized.

The first and at least one second sprocket may be fixedly associated with at least one of the one or more spacer elements. Moreover, the spacer element in this case can act as a rigidifying bar of the sprocket, reinforcing by itself the sprocket against bending and twisting deformations caused by the pulling action of the chain.

In another embodiment of the set of sprockets, the at least one of the one or more spacer elements may comprise the engagement portions and the first and at least one second sprocket lack the engagement portions.

In another embodiment of the set of sprockets, at least one of the first and at least one second sprocket may comprise the engagement portions and the one or more spacer elements lack the engagement portions.

In a further preferred embodiment of the set of sprockets, the first and at least one second sprockets comprise the engagement portions and the one or more spacer elements lack the engagement portions.

The set of sprockets comprises a single spacer element operatively arranged between the first sprocket and the at least one second sprocket.

As an alternative, in the set of sprockets, the first sprocket rests against the at least one second sprocket at the at least one first contact point through a first spacer element and at the at least one second contact point through at least one second spacer element distinct from the first spacer element. In this way, each spacer element consists of a piece having a very simple shape and therefore easy to obtain at a low cost. Moreover, it is possible to manufacture the spacer elements intended to provide support in different areas with materials of different specific weight and strength. For example, the first spacer element can be made from a polymeric or reinforced plastic material, so as to be able to advantageously withstand mainly the compression stresses typically present in the most radially inner areas of the sprockets, whereas the second spacer element can be made from a light metallic material (for example a light alloy) or composite material (for example comprising structural fibers incorporated in a matrix of polymeric material), so as to have a greater structural capability than the first spacer element and be able to withstand mainly the bending and twisting stresses typically present in the most radially outer areas of the sprockets due to the pulling action exerted by the bicycle chain.

In this case, the set of sprockets may comprise a first sprocket with a smaller diameter, a first spacer element arranged between the first sprocket and the first sprocket with a smaller diameter, a second sprocket with a diameter smaller than that of the first sprocket with a smaller diameter, a second spacer element arranged between the first sprocket with a smaller diameter and the second sprocket with a smaller diameter, and a third spacer element arranged between the first sprocket and the second sprocket with a smaller diameter, wherein the at least one first contact point is defined at the at least one third spacer and the at least one second contact point is defined at the first and second spacer elements.

Moreover, in this case, the set of sprockets may comprise a fourth spacer element arranged between the first spacer element and the second spacer element.

In general, the set of sprockets may comprise, close to at least one of the at least one first contact point and the at least one second contact point of the first sprocket and at least one second sprocket, at least one first hole for housing a respective attachment element for coupling the first sprocket with the at least one second sprocket.

In particular, the at least one spacer element may comprise at least one second hole aligned with the at least one first hole for housing the attachment element for coupling the at least one spacer element with the first and at least one second sprockets.

In general, the one or more spacer elements may be made from a lighter material than that of the first and at least one second sprockets.

The one or more spacer elements may be made from a light metallic material or composite material.

In the case in which there is a single spacer element, the spacer element may comprise a radially inner annular portion made from a light metallic material and a radially outer annular portion co-moulded with the radially inner annular portion and made from a composite material.

In the case in which there are two different spacer elements, the first spacer element is made from a polymeric or reinforced plastic material and the second spacer element is preferably made from a light metallic material or composite material.

In another embodiment of the set of sprockets, at least some of the at least one first and at least one second contact point are defined at radial portions of the first sprocket and at least one second sprocket. Furthermore or alternatively, at least some of the at least one first and at least one second contact points are defined at radial extensions of the one or more spacer elements.

In general, in another embodiment of the set of sprockets, the first and at least one second sprockets may have a thickness comprised between 1 and 2 mm, more preferably between 1.4 and 1.7 mm.

In a second aspect thereof, the sprocket assembly for a bicycle rear wheel comprises at least one set of sprockets according to the aforementioned first aspect.

A sprocket assembly has, individually or in combination, all of the structural and functional characteristics discussed above with reference to the set of sprockets described above.

In a third aspect thereof, the sprocket for a sprocket assembly of a bicycle rear wheel, the sprocket being adapted to be mounted in a sprocket assembly in abutment against another sprocket of the sprocket assembly through the interposition of one or more spacer elements, the sprocket comprising engagement portions with a freewheel body of a hub of a rear wheel for a bicycle, the engagement portions defining an ideal circumference for coupling with the freewheel body, wherein it comprises at least one first contact point with at least one of the one or more spacer elements arranged at a first radial distance and at least one second contact point with at least one of the one or more spacer elements arranged at a second radial distance different to the first radial distance, the radial distance between the at least one first contact point and the at least one second contact point being at least equal to ⅓ of the radial extension between the ideal circumference and a radially outer end of the sprocket.

A sprocket can be used in the set of sprockets. Therefore, it has, individually or in combination, the structural and functional characteristics discussed above with reference to the sprockets of the aforementioned assembly.

In particular, the radial distance between the at least one first contact point and the at least one second contact point is at least equal to ½, and more preferably at least equal to ⅔, of the radial extension between the ideal circumference and the radially outer end of the sprocket.

The sprocket may comprise a radially outer toothing having a number of teeth greater than or equal to 15, more preferably greater than or equal to 18.

More The sprocket may comprise at least one intermediate contact area between the at least one first contact point and the at least one second contact point. In this case, The sprocket may comprise a contact surface extending between the at least one first contact point and the at least one second contact point.

The sprocket may comprise a plurality of contact areas defined in a radially inner annular portion thereof. In this case, preferably, the at least one first contact point is defined in the radially inner annular portion.

In another embodiment, the sprocket may comprises a plurality of contact areas arranged in a radially outer annular portion thereof. In this case, preferably, the at least one second contact point is defined in the radially outer annular portion.

In another embodiment thereof, the sprocket may comprise, close to at least one from the at least one first contact point and the at least one second contact point, at least one hole for housing a respective attachment element for coupling the first sprocket with the at least one second sprocket.

Moreover, in the sprocket, at least some of the at least one first and at least one second contact points are defined at radial portions thereof.

In general, in another embodiment of the sprocket, it may have a thickness of between 1 and 2 mm, more preferably between 1.4 and 1.7 mm.

In a fourth aspect thereof, a spacer element for sprockets of a sprocket assembly of a bicycle rear wheel, comprising a substantially annular body provided with engagement portions with a freewheel body of a hub of a bicycle rear wheel, the engagement portions defining an ideal circumference for coupling with the freewheel body, wherein it comprises at least one first contact point with a sprocket of the sprocket assembly arranged at a first radial distance and at least one second contact point with the sprocket arranged at a second radial distance different to the first radial distance, the radial distance between the at least one first contact point and the at least one second contact point being at least equal to ⅓ of the radial extension between the ideal circumference and a radially outer end of the sprocket.

Further, a spacer element may have, individually or in combination, all of the structural and functional characteristics discussed above with reference to the spacer element of the set of sprockets described above, and therefore has all of the aforementioned advantages.

In particular, The radial distance between the at least one first contact point and the at least one second contact point may be at least equal to ½, and more preferably at least equal to ⅔, of the radial extension between the ideal circumference and a radially outer end of the sprocket.

In another embodiment, the spacer element may comprise at least one intermediate contact area between the at least one first contact point and the at least one second contact point. In this case, the spacer element comprises a contact surface extending between the at least one first contact point and the at least one second contact point.

The spacer element may comprise a plurality of contact areas defined in a radially inner annular portion of the substantially annular body. In this case, the at least one first contact point may be defined at the radially inner annular portion of the substantially annular body.

The spacer element may comprise a plurality of contact areas arranged in a radially outer annular portion of the substantially annular body. In this case, the at least one second contact point may be defined at the radially outer annular portion of the substantially annular body.

In another embodiment of the spacer element may comprise, at least one from the at least one first contact point and the at least one second contact point, at least one hole for housing a respective attachment element for coupling the spacer element with the sprocket.

In general, the spacer element may be made from metallic or composite material.

In a specific embodiment thereof, the spacer element comprises a radially inner annular portion made from a light metallic material and a radially outer annular portion co-moulded with the radially inner annular portion and made from a composite material.

In the spacer element, at least some of the at least one first and at least one second contact point are defined at radial extensions thereof.

In a fifth aspect thereof, a bicycle comprises a set of sprockets according to the aforementioned first aspect.

Such a bicycle may have, individually or in combination, all of the structural and functional characteristics discussed above with reference to the set of sprockets described above, and therefore it has all of the aforementioned advantages.

In a sixth aspect thereof, a structural unit for a sprocket assembly of a bicycle comprises at least one sprocket comprising engagement portions with a freewheel body of a hub of a bicycle rear wheel, wherein the at least one sprocket is fixedly coupled with at least one reinforcement element.

The aforementioned reinforcement element, being fixedly coupled with the sprocket, strengthens such a sprocket resisting the bending or twisting deformation to which the sprocket is subjected due to the effect of the torque imparted by the chain during pedaling.

The at least one reinforcement element may be fixedly coupled with the at least one sprocket at least one first coupling portion and at least one second coupling portion distinct from the at least one first coupling portion. Basically, the reinforcement device acts, as a strengthening bar of the sprocket joining together two different portions of the sprocket, avoiding the relative movement thereof by bending and/or twisting deformation.

The at least one second coupling portion may be circumferentially spaced apart from the at least one first coupling portion. The circumferentially may be spaced apart coupling portions strengthen the sprocket against bending deformations.

Moreover, the at least one second coupling portion may be radially spaced apart from the at least one first coupling portion. The radially spaced apart coupling portions strengthen the sprocket against bending and twisting deformations.

The sprocket may comprise, at the at least one first and at least one second coupling portions, respective holes for housing respective attachment elements for coupling the at least one sprocket with the at least one reinforcement element.

The at least one reinforcement element may extend between the at least one first and at least one second coupling portions along a direction of minimum extension, thus allowing the weight of the structural unit to be kept to low levels.

The at least one reinforcement element may be substantially annular shaped and is active at a radially outer annular portion of the at least one sprocket. In this way the entire area below the toothed crown of the sprocket is strengthened, such an area being that most stressed by the chain during pedaling.

In a specific embodiment of the structural unit, the at least one reinforcement element is made in a single piece.

In an alternative embodiment, the at least one reinforcement element is defined by a plurality of connection elements associated with one another at the respective opposite free end portions, the at least one first and at least one second coupling portions being defined at the opposite free end portions of each connection element.

In this case, each connection element may comprise a central portion elongated in the radial direction and two opposite bridge portions extending cantilevered from opposite sides with respect to the central portion.

Moreover, the central portion may have a forked configuration so as to be able to house a sprocket of the sprocket assembly.

In another embodiment, the structural unit comprises two sprockets associated with the at least one reinforcement element.

In this case, the at least one reinforcement element may be fixedly coupled with a first sprocket at least one first coupling portion and with a second sprocket at least one second coupling portion distinct from the at least one first coupling portion, wherein the second sprocket is distinct from the first sprocket and is fixedly coupled with the at least one reinforcement element on the opposite side with respect to the first sprocket. In this way, there is a transfer of stresses from one sprocket to another through the reinforcement element, with the result that both of the aforementioned sprockets are strengthened.

In a seventh aspect thereof, the a sprocket assembly for a bicycle rear wheel comprises at least one structural unit according to the aforementioned sixth aspect.

Such a sprocket assembly has, individually or in combination, all of the structural and functional characteristics discussed above with reference to the structural unit described above.

In an eighth aspect thereof, the reinforcement element lacks engagement portions with a freewheel body of a hub of a bicycle rear wheel, wherein it comprises at least one first coupling portion with at least one sprocket of the sprocket assembly and at least one second coupling portion with the at least one sprocket, the at least one second coupling portion being distinct from the at least one first coupling portion.

Such a reinforcement element can be used in the structural unit described above and has, individually or in combination, all of the structural and functional characteristics discussed above with reference to such a unit, thus allowing all of the aforementioned advantages to be achieved.

In particular, the at least one second coupling portion is circumferentially and/or radially spaced apart from the at least one first coupling portion.

The aforementioned reinforcement element comprises, at the at least one first and at least one second coupling portion, respective holes for housing respective attachment elements for coupling the reinforcement element with the at least one sprocket.

The reinforcement element is substantially annular shaped and is intended to act at a radially outer annular portion of at least one sprocket.

In a first embodiment thereof, the aforementioned reinforcement element comprises an elongated central portion and two opposite bridge portions extending canti-levered from opposite sides with respect to the central portion, the at least one first and at least one second coupling portions being defined at the opposite free end portions of the reinforcement element.

The central portion has a forked configuration so as to be able to house a sprocket of the sprocket assembly.

In another embodiment thereof, the aforementioned reinforcement element is made from a light metallic material or composite material.

In a ninth aspect thereof, the bicycle comprises a structural unit according to the aforementioned sixth aspect.

The bicycle has, individually or in combination, all of the structural and functional characteristics discussed above with reference to the structural unit described above.

DETAILED DESCRIPTION

With initial reference to FIG. 1, a hub 1 for a bicycle rear wheel comprises a hub body 2 and an element of freewheel body 3 (hereafter referred to as "freewheel body"). The freewheel body 3 is coupled with the hub body 2 through a known system such as that shown in US Pub. 2006/0231366, incorporated herein by reference as if fully set forth (but in no way limiting in its manner of engagement or design), through which the freewheel body 3 can rotate idly in a direction of rotation about a rotation axis X and trail the hub body 2 with it in the opposite direction of rotation.

The freewheel body 3 has a substantially cylindrical shape with some grooves 5 on the outer surface thereof.

A sprocket assembly 10, which as shown has eleven sprockets, although other numbers of sprockets are possible, is mounted on the freewheel body 3, engaged with the grooves 5. The sprocket assembly 10 comprises a series 12 of sprockets that are independent from one another and a series 14 of sprockets constrained one another.

The independent sprockets of the series 12 are spaced apart one another through cylindrical spacer elements 13 that do not engage with the freewheel body 3. The series of constrained sprockets 14 comprises two sets of sprockets 16 and 17 arranged side-by-side and spaced apart by a cylindrical spacer element 13.

When the independent sprockets of the series 12 and the constrained sprockets of the series 14 are mounted on the freewheel body 3, they stop against an element of axial abutment 18 of the freewheel body 3 and are held by a ring nut 20 screwed onto the freewheel body 3.

The first sprocket (the sprocket with the largest diameter) and the last sprocket (the sprocket with the smallest diameter) of the sprocket assembly 10 have an engagement portion 22 with the freewheel body 3 axially shifted with respect to a toothed crown 24 for engaging with a chain (not illustrated). In particular, the engagement portion 22 of the first sprocket of the sprocket assembly 10 is shifted in the axial direction towards the outside of the hub 2, i.e. towards the ring nut 20, or in other words towards a central area in the axial direction of the sprocket assembly 10, whereas the engagement portion 22 of the last sprocket of the sprocket assembly 10 is shifted in the axial direction towards the inside of the hub 2, i.e. towards the element of axial abutment 18.

The set 16 is better illustrated in FIGS. 2 and 3 and comprises two support sprockets 25, arranged at the ends according to the direction of the rotation axis X, and a supported sprocket 26 arranged between the support sprockets 25.

The support sprockets 25 comprise a radially inner annular portion 28 for engagement with the freewheel body arranged in the radially most inner area thereof, the portion 28 being equipped with engagement portions with the freewheel body 3. In the example of FIGS. 2 and 3 the portion 28 is equipped with teeth 30 and grooves 32 adapted to respectively couple with the grooves 5 and the teeth between the grooves 5 themselves of the freewheel body 3. One of the teeth 30a has a shape different to the others to allow the support sprocket 25 to be mounted on the freewheel body 3 in a single predetermined position.

The support sprockets 25 also comprise a radially outer annular portion 34, concentric to the radially inner annular portion 28 and provided with a toothing for engaging with a bicycle chain. the portion 34 will also be referred to as "toothed crown" hereinafter.

The annular engagement portion 28 and the toothed crown 34 are joined one another through connecting portions 36, preferably radial, also known as "arms". The arms 36 comprise two holes 38 arranged at different radial distances from the axis X. The holes 38 of the two support sprockets 25 are aligned with one another in the axial direction and respective rivets 40—or other fixing elements like screws, bolts or pins—that make the two support sprockets 25 integral with one another, engage in them.

The support sprockets 25 also comprise respective additional holes 42, aligned with one another in the axial direction, in which additional rivets 44 engage.

The holes 38 and 42 are preferably identical and comprise a portion with a greater diameter and a portion with a smaller diameter. The portion with a greater diameter provides a housing and resting area for the heads 46 and 48 respectively made at the opposite free ends of the rivets 40 and 44.

In the example of FIGS. 2 and 3, there are three additional holes 42 and they are angularly arranged equally spaced apart on the same ideal circumference at the radially outer annular portion 34 of the support sprockets 25; there are three arms 36 and they are angularly arranged equally spaced apart one another, staggered apart one another by about 120° and staggered by about 60° with respect to the additional holes 42.

The intermediate sprocket 26, more clearly visible in FIG. 7, where some parts of the set 16 have been removed, differs from the end sprockets 25 due to the absence of engagement portions with the freewheel body 3. Moreover, this sprocket 26 has holes 50 adapted to be aligned just with the most radially outer holes 38 and with the additional holes 42 of the support sprockets 25. In this way the intermediate sprocket 26 is supported by the support sprockets 25 through the most radially outer rivets 40 and the additional rivets 44.

In the example of FIG. 7, therefore, there are six holes 50 and they are angularly equally spaced apart by about 60°.

The holes 50—and therefore also the holes 38 and 42 with which they are aligned—are all arranged at the same radial distance from the rotation axis X. It should be noted that such a radial distance has a lower limit, since it is necessary to allow the engagement of the chain on the sprocket 25 with the smallest diameter. Such a radial distance is preferably selected so as to minimize the distance between the circumference defined at the outer end of the toothed crown 34 and the circumference defined at the maximum radial size of the holes 38 and 42 on the sprocket 25 with the smallest diameter.

The intermediate sprocket 26 comprises a radially outer toothed annular portion, or toothed crown, indicated with 54. The holes 50 are made on radial projections 52 extending cantilevered towards an inner or central area of the sprocket 26 starting from a radially inner circumferential end portion of the toothed crown 54. It should be noted that the intermediate sprocket 26, not comprising engagement portions with the freewheel body 3 nor connecting arms, nor radially inner annular portions, is lighter than the support sprockets 25.

The sprockets 25 and 26 of the set 16 are kept at a predetermined distance apart one another through spacer elements that—providing resting in the axial direction—prevent sliding of the rivets 40 and 44 and rigidify the sprockets preventing the bending and twisting deformations due to the pulling action of the chain.

The spacer elements can be of various sizes and shapes, so as to make them easier and more cost-effective to manufacture. In particular, in the example illustrated in FIGS. 2-4 and 7, a first cylindrical spacer element 56 is provided arranged between the engagement portions 22 of the two support sprockets 25. The spacer element 56 is preferably free, in the sense that it is not fixed to the sprockets but is inserted in the space between the engagement portions 22 from which it cannot come out due to its radial dimensions. It may also held by contact pressure between spacer element 56 and sprockets 25. The material used is preferably any material resistant to compression, more preferably a polymeric material or a reinforced plastic material, i.e. a polymeric material to which non-structural reinforcement elements have been added, normally powders, granules or short fibers, i.e. of a size lower than five millimeters.

Two annular spacer elements 58, identical in the size and in the shape, are interposed between each support sprocket 25 and the intermediate sprocket 26 and can be clearly seen in FIG. 4, which shows the set 16 without the sprocket with the smallest diameter 25, and in FIGS. 5 and 6.

Each spacer element 58 comprises a substantially annular body 60, on which holes 62 are made aligned with the holes 38 of the support sprockets 25 and with respective holes 50 of the intermediate sprocket 26 for the passage of the rivets 40 and additional holes 63 aligned with the additional holes 42 of the support sprockets 25 and with the remaining holes 50 of the intermediate sprocket 26 for the passage of the additional rivets 44.

The holes 62 may be made in a plurality of portions 64 elongated in the radial direction. In particular, the substantially annular body 60 comprises three portions 64 having a larger size in the radial direction. Such portions 64 are connected one another through bridge portions 66 on which lightening cavities 68 are made, preferably made in the form of through hollows, and the additional holes 63. Each bridge portion 66 comprises, in particular, two lightening cavities 68 arranged on opposite sides with respect to the respective additional hole 63.

The bridge portions 66 are projected in the circumferential direction starting from a median area of the portions 64 elongated in the radial direction.

In the set 16, the support sprocket 25 goes into abutment against the intermediate sprocket 26 and against the other support sprocket 25, through the cylindrical spacer element 56 and the annular spacer element 58, at a plurality of respective contact areas arranged at different radial distances. In particular, the radially inner annular portions 28 of the support sprockets 25 rest upon one another through the cylindrical spacer element 56, whereas the arms 36 and the coupling areas around the additional holes 42 of the support sprockets 25 rest respectively, on opposite sides, at the coupling areas around the holes 50 of the intermediate sprocket 26 through the portions 64 elongated in the radial direction of two different spacer elements 58 and the coupling portions around the holes 63 of the two spacer elements 58. The radial extension of the resting between the sprockets between a first most radially inner extreme resting point 56' (at the radially inner edge of the spacer 56) and a second extreme resting point 58' (at the radially outer edge of the spacer 58) is equal to ⅓, preferably ½, more preferably ⅔, of the radial extension between an ideal circumference 28' defined by the engagement portions 28 to the freewheel body 3 and the radially outer end of the smallest sprocket of the set 16. As can be seen in FIGS. 2 and 3, the ideal circumference is defined by the surface of the annular portion 28 that in engagement condition is intended to go into contact with the outer cylindrical surface 5' (FIG. 1) of the freewheel body 3. It is also possible to hypothesize solutions in which the annular portion 28 does not go into contact with the outer surface of the freewheel body, however also in this case the ideal circumference coincides with the maximum outer diameter of the freewheel body that is thought to be engaged in the annular portion 28. In this way the height h always defines the part of sprocket projecting from the freewheel body 3.

As can be seen from the illustrated example, by extension of the resting it is meant the distance between the extreme resting points in the radial direction, since between the extreme points the effective resting can be discontinuous.

From what has been described above, it can thus be seen that in the set 16 each spacer element 58 is associated with a support sprocket 25 at a plurality of distinct coupling portions, and each sprocket is in abutment with an adjacent sprocket, through the spacer elements 56 and 58, at contact areas having high radial extension. A set of sprockets is thus made in which the spacer element 58 acts as structural reinforcement element of the sprockets, contributing to the increase in the structural strength of the individual sprockets.

Moreover, when the spacer element 58 is made from lighter material than the sprockets, the weight of the set 16 remains low. In order to have such a structural property the spacer element 58 can for example be made from light metallic alloy or from a composite material comprising structural fibers in a matrix of polymeric material.

Typically, the structural fibers are selected from the group consisting of carbon fibers, glass fibers, aramid fibers, ceramic fibers, boron fibers, polyester fibers and combinations thereof, the carbon fibers being preferred.

The arrangement of the structural fibers in the polymeric material can be a random arrangement of pieces or small pieces of structural fibers, a substantially unidirectional orderly arrangement of fibers, a substantially bi-directional orderly arrangement of fibers, for example woven according to a weft and a warp, or a combination of the above.

The polymeric material of the matrix may be thermosetting. However, this does not rule out the possibility of using a thermoplastic. Also, the matrix may comprise an epoxy resin.

Now with reference to FIGS. 3 and 7, between the two structural spacer elements 58, around the rivets 40 (and therefore around the holes 38) radially arranged more internally, there are cylindrical spacer rings 70 of limited radial size.

The cylindrical rings 70 and the spacer element 56 can be made from any material capable of withstanding an axial load, for example even of the same material as the structural spacer elements 58. The material may use a polymeric material or a reinforced plastic material, i.e. a polymeric material to which non-structural reinforcing elements have been added, normally powders, granules or short fibers, i.e. of a size lower than five millimeters.

FIGS. 8 and 9 illustrate the set 17 of the sprocket assembly 10 illustrated in FIG. 1. The set 17 has sprockets with a smaller diameter with respect to the set 16, and differs from it mainly in that the support sprockets 72 have holes 73 for the passage of rivets 74 (or of other fixing elements like screws, bolts or pins) just on connecting arms 76 between the radially inner annular portion 78 for the coupling with the freewheel body 3 and the toothed crown 80.

In the example of FIG. 8, there are five arms 76. Moreover, all of the holes 73 are arranged at the same radial distance from the rotation axis X and are angularly equally spaced apart one another.

Between the support sprockets 72 an annular spacer element 82 substantially identical to the spacer element 56 of the set 16 is interposed, whereas between each support sprocket 72 and a supported intermediate sprocket 86 a structural spacer element 88 similar to the structural spacer elements 58 of the set 16 is interposed, more clearly visible in FIG. 10, where the support sprocket 72 having a smaller diameter has been removed from the set 17. From FIG. 10 it is particularly clear that the structural spacer element 88 has holes 90 (in the example of FIG. 10 they are five) for passage of the rivets 74 or similar, and that at such holes 90 the structural spacer element 88 has a greater size in the radial direction with respect to the other areas.

Hereafter it shall be described alternative embodiments of the set 16 in which elements that are similar from the structural point of view, or corresponding elements from the functional point of view, are indicated by increasing the reference numerals assigned up to now by 100, or by a multiple thereof.

Figure 11:
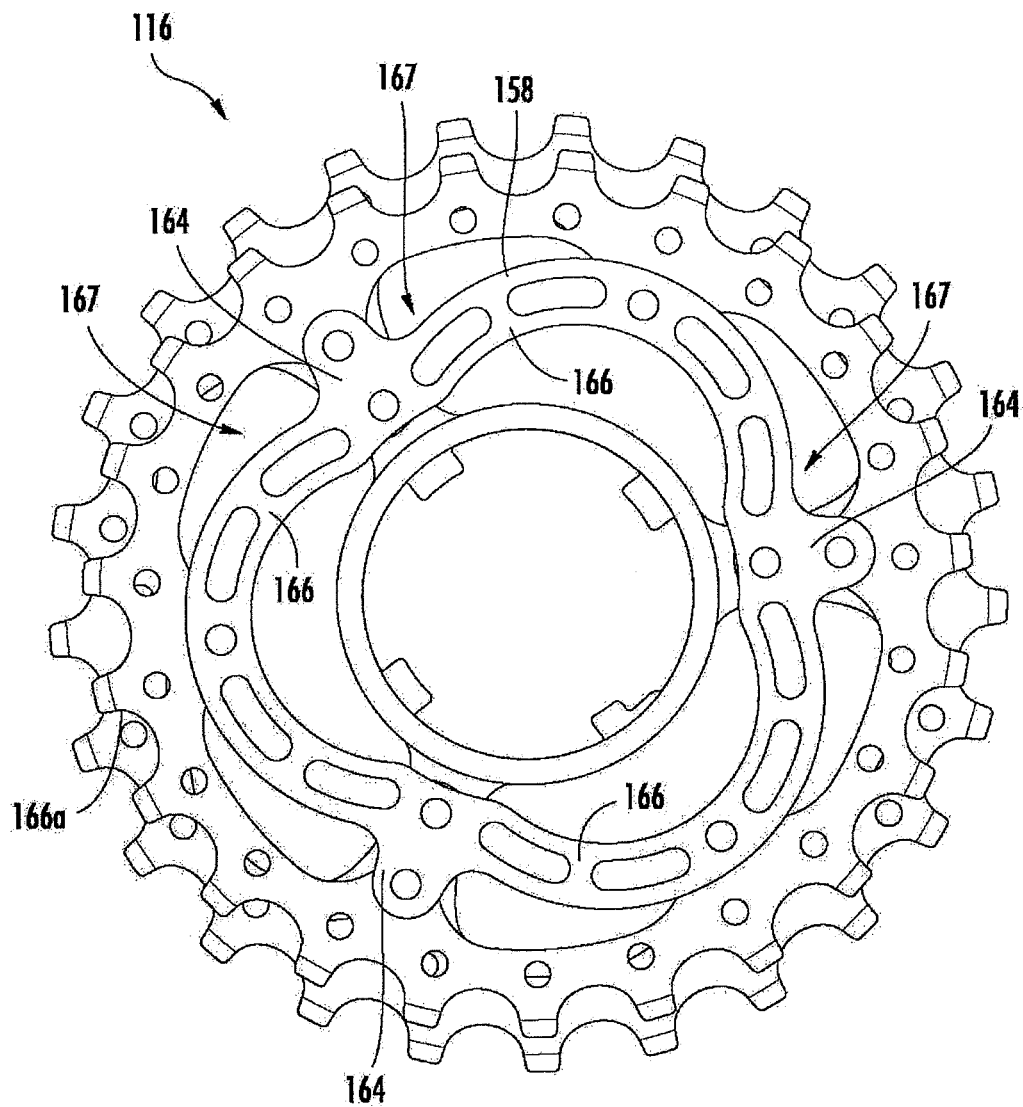

FIG. 11 illustrates a set 116 similar to the set 16 of FIG. 2 and without the support sprocket with the smallest diameter (and therefore analogous to the part of the set 16 illustrated in FIG. 4). The set 116 differs from the set 16 solely in the shape of the structural spacer elements 158. In these spacer elements 158 the bridge portions 166 are circumferentially connected to portions 164 elongated in the radial direction, so as to define respective humps 166a. In this way free areas 167 are created close to the fixing areas to the portions 164 elongated in the radial direction, in which the bridge portions 166 do not completely obstruct the space between one sprocket and the other, especially between the two sprockets having smaller diameter, thus leaving a way out both in the axial direction and in the radial direction for the mud or other sediment that may be deposited on the sprocket assembly.

Figure 12:
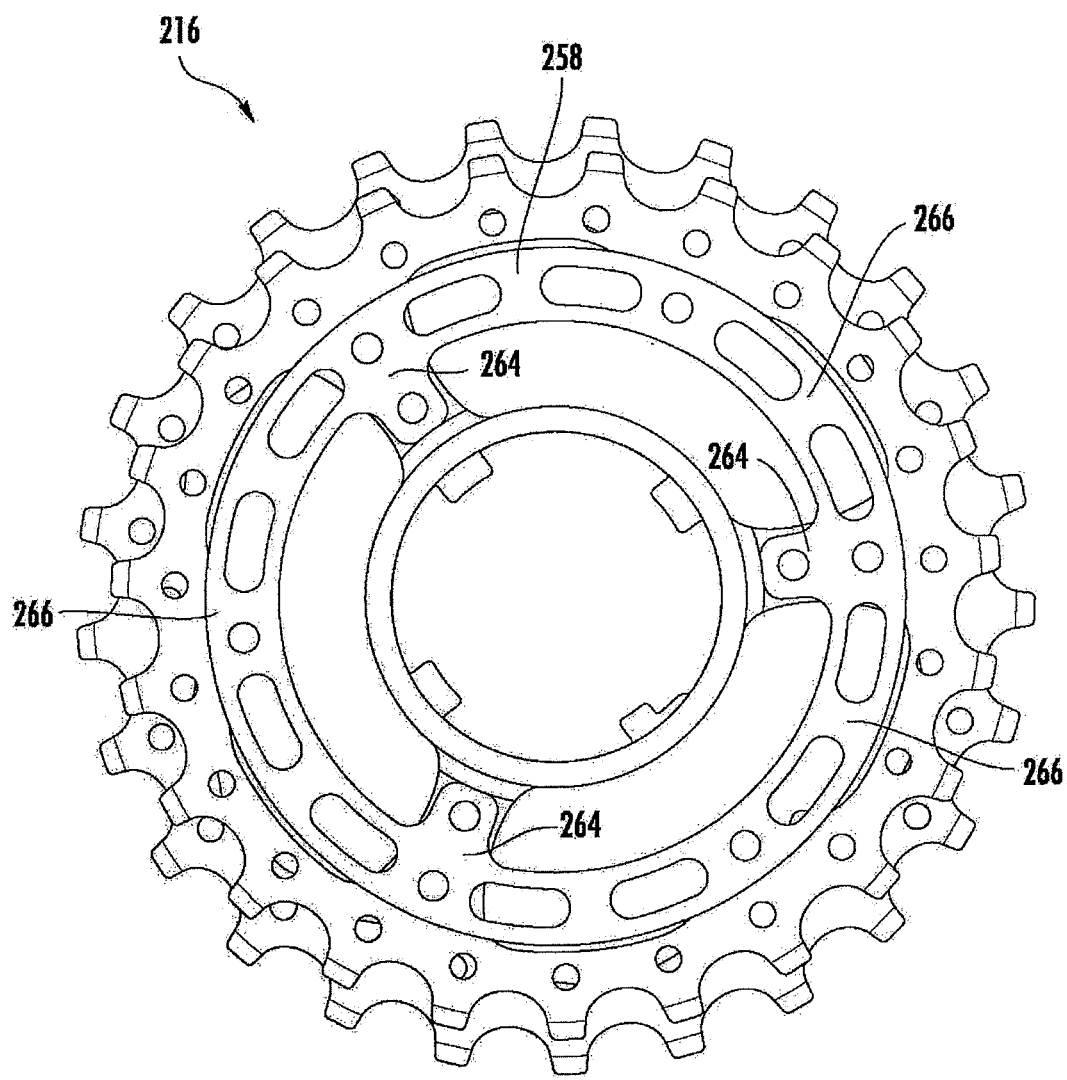

FIG. 12 illustrates a set 216 similar to the set 16 of FIG. 2 and again without the support sprocket with the smallest diameter (and therefore analogous to the part of the set 16 illustrated in FIG. 4). The set 216 differs from the set 16 for the shape of the structural spacer element 258. In particular, the bridge portions 266 extend between two portions 264 elongated in the radial direction and are associated with a radially outer area of the portions 264 elongated in the radial direction so as to define a ring. Such a ring is substantially circular crown shaped and the bridge portions 266 are interrupted just by the elongated portions 264 to which they are joined circumferentially in the radially most outer area. The portions 264 elongated in the radial direction thus extend cantilevered radially inwards from the ring.

Figure 13:
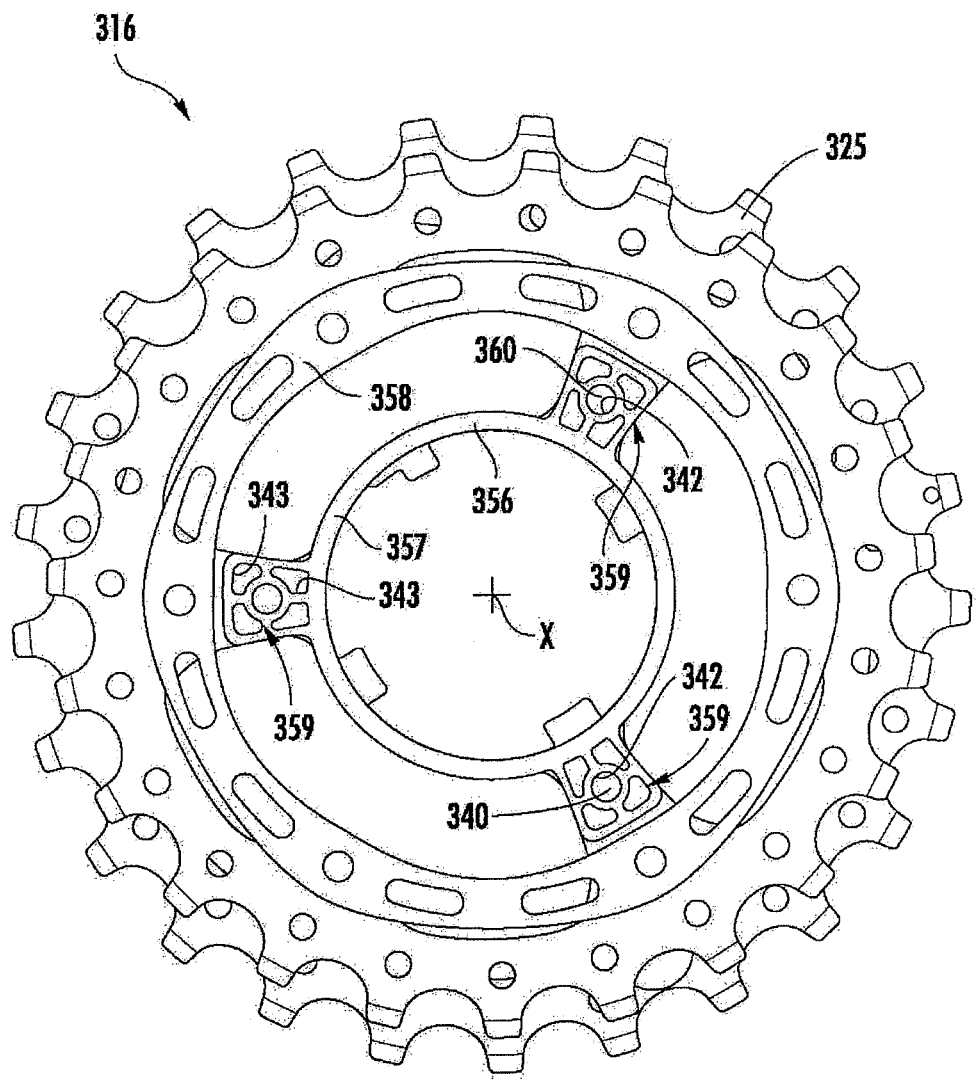

FIG. 13 illustrates a set 316 similar to the set 16 of FIG. 2 and again without the support sprocket with the smallest diameter (and therefore analogous to the part of the set 16 illustrated in FIG. 4). The set 316 differs from the set 16 for the shape both of the structural spacer elements 358 and of the radially most inner spacer element 356.

The structural spacer elements 358 are substantially annular bodies and comprise holes for the passage of rivets, or similar fixing elements, all arranged at the same radial distance from the axis X. The radially most inner spacer element 356 has a substantially annular portion 357, for example cylindrical, from which arms 359 project cantilevered, radially outwards, at the distal ends of which holes 342 are made for engagement with rivets 340, or similar fixing elements, which join the support sprockets 325 (only one is shown). The area of the arms 359 around the holes 342 is made lighter by openings 343.

FIGS. 14 and 15 illustrate a further set according to the invention, indicated with 416 and similar to the set 316 of FIG. 13. In particular, FIG. 14 illustrates such a set 416 without the support sprocket with the smallest diameter and therefore such a FIG. 14 is totally analogous to the part of the set 316 illustrated in FIG. 13. It should be noted that the set 416 differs from the set 316 of FIG. 13 in that the structural spacer elements 358 and the radially most inner spacer element 356 are fused into a single spacer element 455. In particular, the spacer element 455 has a radially inner annular portion 456, for example cylindrical, of a size such as to entirely occupy the space between the two support sprockets 425, and a forked portion 458 that projects radially outwards from the radially inner annular portion 456 to be inserted between each support sprocket 425 and the intermediate sprocket 426. In particular, the forked portion 458 comprises a pair of substantially annular portions 458a, radially outer and facing one another in the axial direction, and a plurality of pairs of arms 458b facing one another in the axial direction and each extending between the radially inner annular portion 456 and the radially outer annular portion 458a. In the illustrated example, there are three pairs of arms 458b. The substantially annular portions 458a have a plurality of recesses 458c with respect to the circumference of maximum radial size, positioned and sized to allow the supported sprocket 426 to be housed through a bayonet movement, i.e. through insertion of the radial projections 452 of the sprocket 426 in the recesses 458c, and subsequent rotation into the operative position in which the holes 450 of the sprocket 426 are aligned in the axial direction with the holes 462 and 463 of the spacer element 455.

The spacer element 455 can in this case for example be made from light alloy or a composite material comprising structural fibers in a polymeric matrix. It is also provided to make the radially inner annular portion 456 from a light material resistant to compression and the structural forked portion 458 from a light material resistant to bending and twisting. For example it is possible to co-mold a cylindrical aluminum insert, which substantially constitutes the radially inner annular portion 456, in a mould in which a composite material is injected, which constitutes the forked portion 458.

FIG. 16 illustrates a set 516 that differs from the set 116 of FIG. 11 in that the structural spacer elements 158 are replaced by a plurality of connection elements 558 associated with one another at the respective free end portions to form overall a substantially annular structure 560, as shown in FIG. 17. In particular, the connection elements 558 are associated with each other at the holes 563 through the rivets 544. Each bridge 558 comprises a central portion 564, prevalently elongated in the radial direction, so that the holes 562 for the rivets 540 can be made thereon. The central portion 564 is fork-shaped, so that it can be inserted between each support sprocket 525 (only one is illustrated in FIG. 16) and the intermediate sprocket 526.

From the elongated portion 564 two strengthening arms 566 circumferentially extend cantilevered at the ends of which holes 563 are made for the insertion of the rivets 544. The arms 566 extend on circumferential planes that are parallel but do not coincide. In mounted condition, one of the two arms 566 is inserted between a first support sprocket 525 and the central sprocket 526, whereas the other arm is inserted between the other support sprocket 525 and the central sprocket 526.

As is clear from FIG. 17, this embodiment, with respect to those with completely annular structural spacer elements, has the advantage of being lighter, since there are circumferential tracts in which there is a single strengthening arm 566.

Finally, it should be noted that the arms 566 extend from the elongated portion 564 starting from the radially most inner area thereof so that there remains a free area 567 between the arms 566 and the sprockets 525 and 526 to allow the passage of the mud and other impurities. The presence of a single arm 566 below these areas makes the passage even easier.

FIG. 18 illustrates a set 616 comprising just two sprockets. In particular, a first support sprocket 625 with an annular portion 628 for engagement with the freewheel body 3 supports cantilevered a second sprocket 626 through rivets 640 and additional rivets 644. Between the two sprockets there are respectively interposed an annular structural spacer element 658, comprising a pair of holes 662 for the rivets 640, and cylindrical spacer rings 670 around the additional rivets 644. Between two sets 616 mounted consecutively on a freewheel body 3 there can be interposed a cylindrical spacer element 656.

FIG. 19 illustrates a set 716 that differs from the set 16 of FIG. 2 in that each support sprocket 725 has six radial connecting arms 736 between the radially inner annular portion 728 and the toothed crown 734, instead of the three arms 36 of the sprockets 25 of FIG. 2. Each connecting arm 736 has a single hole 762 for the passage of a rivet 740. Therefore additional rivets outside of the connecting arms 736 are not necessary. Each arm 736 is triangular shaped with the base directed radially inwards. In order to make the arms lighter lightening holes 761, or openings with any type of shape, are provided below the holes 762. The structural spacer elements 758 are in this case simple rings without portions elongated in the radial direction, whereas between the engagement portions 728 there is provided a cylindrical spacer element as the spacer element 56 of FIG. 3.

As an alternative to the lightening holes, FIG. 20 shows a set 816 in which the connecting arms 836 are made with a median portion 836a of limited size, for example substantially the same as, or even smaller than, the diameter of the holes 762.

The solutions with many arms like those of FIGS. 19 and 20 are heavier but more rigid compared to those with less arms like that of FIG. 2.

FIGS. 21 and 22a-c show a variant of a cylindrical spacer element 956 that can be used as an alternative to the cylindrical spacer elements 56, 156, 256, 356, 456, 556, 656, 756, 856 of the previous embodiments. In particular, the cylindrical spacer element 956 has hooking teeth 955 to be hooked to one of the radially inner annular portions 28, 128, 228, 328, 428, 528, 628, 728, 828 of the previous embodiments. The engaging teeth 955 project cantilevered in the axial direction from flat annular walls 949, so as to prevent the relative movement in the radial direction of the spacer element 956 with respect to the engagement portions when the spacer element is mounted between two support sprockets.

There may be three of the engaging teeth 955. In this case, the teeth 955 are positioned angularly staggered apart one another by 120°.

FIGS. 23 and 24 show a further set 1016, in which two sprockets 1025 are provided coupled one another, both comprising an engagement portion 1028 with the freewheel body. The two sprockets 1025 are rigidly constrained through rivets 1040 and additional rivets 1044, which also hold a structural spacer element 1058 in a single piece. The spacer element rests upon the two faces, facing one another, of the sprockets 1025 for most of the height of the smallest sprocket 1025, in particular the resting height H is greater than or equal to ⅓ of the height h (i.e. half the difference between outer diameter and inner diameter) of the smallest sprocket 1025, preferably greater than or equal to ½ of the height h, even more preferably it is greater than or equal ⅔ of h.

FIG. 25 shows a section view of a set 1216 comprising four sprockets, in particular two support sprockets 1225 arranged at the axial ends of the set 1216 and two central sprockets 1226 supported by the support sprockets 1225 through rivets 1240. Just the support sprockets 1225 comprise an engagement portion 1228 with a freewheel body 3 between which a cylindrical spacer element 1256 is interposed. Structural spacer elements 1258 are arranged between each pair of sprockets in a more radially outer position with respect to the cylindrical spacer elements 1256, and are constrained to the sprockets themselves through the rivets 1240.

The set 1216 is shown mounted on a freewheel body 3 in association with two free sprockets 1212.

The illustrated examples show just some of the possible configurations, for example the number of sprockets for each set can vary from a minimum of two up to comprising all of the sprockets of the sprocket assembly. However, sets with few sprockets can be quickly interchangeable with sets comprising sprockets with different sizes to provide sprocket assemblies meeting the requirements of each individual cyclist or of each individual route. Larger numbers of sprockets make this quick interchangeability more difficult. Moreover, the support sprockets are not necessarily the end ones, or all the end ones or only the end ones.

FIGS. 26 and 27 show an assembly 1116 wherein a single spacer element 1156 that comprises an engagement portion 1128 with the freewheel body and radial arms 1164 and 1164a for supporting the sprockets 1125 and 1126 is provided, the sprocket 1126 being the one with the smallest diameter. Each sprocket 1125 and 1126 in turn comprises short radial arms 1136 and long radial arms 1136a. The long radial arms 1136a rest on the radial arms 1164a for most of their length, preferably for substantially the entire length thereof, so as to provide a very extended side support for the two sprockets. In particular, the support extends between radially outer points 1195 corresponding to the distal end of the arms 1164a and radially inner points 1196 corresponding to the distal ends of the arms 1136a. The distance H between the points 1195 and 1196 is preferably at least equal to ⅓ of the radial extension h between the ideal circumference for coupling with the freewheel body, defined by the engagement portions with the freewheel body, and a radially outer end of the smallest sprocket 1126, even more preferably H>½ h or else H>⅔ h.

FIG. 28 shows a further embodiment of a sprocket assembly, wholly indicated with 2010 and mounted on a freewheel body 2003, comprising grooves 2005 on the outer surface thereof.

Each sprocket 2025 of the sprocket assembly 2010 comprises in the radially inner portion thereof a toothing 2028 for the engagement of the grooves 2005. The sprockets 2025 are spaced apart through annular spacer elements 2056 that do not engage with the grooves 2005 and are not fixedly connected to the sprockets 2025.

In the sprocket assembly 2010 it is possible to identify a plurality of sets of sprockets, each set comprising a spacer element 2056 and two sprockets 2025 in abutment with the spacer element 2056 on opposite sides. Each spacer element 2056 rests against the opposite surfaces of the two adjacent sprockets 2025 for a height H preferably at least equal to ⅓ of the radial extension h between the ideal circumference for coupling with the freewheel body 2003, defined by the engagement toothing 2028 of the grooves 2005, and a radially outer end of the sprocket 2025 with the smallest diameter of the two consecutive sprockets. More preferably H>½ h, even more preferably H>⅔ h.

FIG. 29 shows a portion of a set of sprockets, wherein a sprocket 3025 is associated with a spacer element 3058 that also acts as a reinforcement element or structural strengthening element. The element 3058 can be configured like one of the structural spacer elements described up to now, and in the example of FIG. 29 it is configured like the spacer element 58 of FIGS. 4, 5 and 6.

The element 3058 is rigidly coupled with the sprocket 3025 in at least two distinct points. In this way, the element 3058 behaves like a strengthening bar for the sprocket 3025.

The element 3058 is coupled with the sprocket through a plurality of rivets 3040—or other attachment elements like screws, bolts or pins—preferably distributed along at least one circumference, such a circumference preferably being close to the distal end of the sprocket 3025 (in this way, the sprocket 3025 is reinforced in the area that in operation is more subjected to bending stress). FIG. 30 is a diametric section of the assembly of the sprocket 3025 and of the element 3058 of FIG. 29.

FIGS. 31 and 32 show an alternative reinforcement element 4058, which connects two sprockets 4025 arranged facing one another. The element 4058 can be configured like one of the structural spacer elements described up to now, and in the example of FIGS. 31 and 32 it is configured like the spacer element 58 of FIGS. 4, 5 and 6.

The element 4058 is rigidly coupled with one of the sprockets 4025 in a plurality of points 4062 and is rigidly coupled with the other sprocket 4025 in a plurality of points 4063. In this way, the element 4058 behaves like a strengthening bar for the sprockets 4025.

The element 4058 is coupled with the sprocket 4025 with the greatest diameter through a plurality of rivets 4040—or other attachment elements like screws, bolts or pins—preferably distributed along at least one circumference, and it is coupled with the sprocket 4025 with the smallest diameter through a plurality of rivets 4044—or other attachment elements like screws, bolts or pins—also preferably distributed along at least one circumference. The rivets 4040 and 4044 may be in positions angularly spaced apart.

Because of the mutual support of the sprockets that are fixedly constrained one another as a single structural unit, the sprockets resist bending and twisting that in use, is stressed by a chain. Because they are a single unit, the thickness of the individual sprockets can be reduced thus being able to house even eleven or more sprockets on a freewheel body of standard type. For example, the thickness of the sprockets can be between 1 and 2 mm or even more preferably between 1.4 and 1.7 mm.

The increase in the structural strength of each individual sprocket through the effect of the nearby sprockets is also helped by the cylindrical spacer elements 56, 156, 256, 356, 456, 556, 656, 756, 856, 956 and structural spacer elements 58, 158, 258, 358, 458, 558, 658, 758, 858, 1058 that are interposed between the sprockets as spacing means capable of blocking the deformations due to bending of the sprocket engaged by the chain, splitting them also over the neighboring sprockets.

Moreover, the structural spacer elements 58, 158, 258, 358, 458, 558, 658, 758, 858, 1058, being rigidly constrained to the sprocket, in proximity to the toothed crown, already by themselves reinforce the sprocket against deformations due to bending and twisting.

Of course, a person of ordinary skill in the art can bring numerous modifications and variants to the sprocket module for a bicycle described above, in order to satisfy contingent and specific requirements, all of which are anyway covered by the scope of protection as defined by the following claims.

The invention claimed is:

1. Set of sprockets for mounting on a freewheel body of a hub that is configured to be associated with a bicycle rear wheel, comprising:
a first sprocket with a first diameter, a second sprocket with a diameter that is less than the first diameter, and at least two distinct spacers arranged between the first and second sprockets, wherein at least one of the first and second sprockets has circumferential engagement portions that are configured to engage the freewheel body of the hub of the bicycle rear wheel, and the at least two spacers extend circumferentially about the freewheel body, wherein:
(i) an inner spacer of the at least two spacers contacts the second sprocket at a first contact point positioned at a first radial distance from a longitudinal rotation axis, and
(ii) an outer spacer of the at least two spacers contacts the second sprocket at a second contact point positioned at a second radial distance from the longitudinal rotation axis,
wherein the inner and outer spacers of the at least two spacers are radially spaced apart with respect to each other, and said first and second contact points are separated by a radial distance that is at least ⅓ of a radial extension between the circumferential engagement portions of the at least one of the first and second sprockets and a radially outer end of the second sprocket as measured from the longitudinal rotation axis.

2. Set of sprockets according to claim 1, wherein the radial distance between the first contact point and the second contact point is at least ½ of the radial extension between the circumferential engagement portions and the radially outer end of the second sprocket.

3. Set of sprockets according to claim 1, wherein the radial distance between the first contact point and the second contact point is at least ⅔ of the radial extension between the circumferential engagement portions and the radially outer end of the second sprocket.

4. Set of sprockets according to claim 1, wherein the second sprocket has a number of teeth that is greater than or equal to 15.

5. Set of sprockets according to claim 1, wherein the second sprocket has a number of teeth that is greater than or equal to 18.

6. Set of sprockets according to claim 1, wherein the outer spacer contacts the first sprocket at least one intermediate contact area between the first contact point and the second contact point.

7. Set of sprockets according to claim 6, wherein the outer spacer contacts the second sprocket at a surface portion extending between the first contact point and the second contact point.

8. Set of sprockets according to claim 1, wherein the inner spacer contacts the second sprocket at a plurality of contact areas defined in a radially inner annular portion of the second sprocket.

9. Set of sprockets according to claim 8, wherein the inner spacer contacts the second sprocket along all of the radially inner annular portion of the second sprocket.

10. Set of sprockets according to claim 8, wherein the first contact point is defined in the radially inner annular portion.

11. Set of sprockets according to claim 1, wherein the outer spacer contacts the second sprocket at a plurality of contact areas arranged in a radially outer annular portion of the second sprocket.

12. Set of sprockets according to claim 11, wherein the outer spacer contacts the second sprocket along all of the radially outer annular portion of the second sprocket.

13. Set of sprockets according to claim 11, wherein the second contact point is defined in the radially outer annular portion.

14. Set of sprockets according to claim 1, wherein the first and second sprockets are fixedly associated with at least one of the at least two spacers.

15. Set of sprockets according to claim 1, wherein at least one of the first and second sprockets comprises a radially inner annular portion that is radially spaced away from the freewheel body.

16. Set of sprockets according to claim 1, the first and second sprockets comprise, adjacent to at least one of the first contact point and the second contact point, at least one first hole for housing a respective attachment element for coupling the first sprocket with the second sprocket.

17. Set of sprockets according to claim 16, wherein the first and second sprockets are fixedly associated with at least one of the at least two spacers, wherein said at least one of the at least two spacers comprises at least one second hole aligned with the at least one first hole for housing a respective attachment element for coupling the at least one spacer with the first and second sprockets.

18. Set of sprockets according to claim 1, wherein the at least two spacers are made from a lighter material than that of the first and second sprockets.

19. Set of sprockets according to claim 18, wherein the at least two spacers are made from a light metallic material or composite material.

20. Set of sprockets according to claim 18, wherein the inner spacer is made from a polymeric or reinforced plastic material.

21. Set of sprockets according to claim 20, wherein the outer spacer is made from a light metallic material or composite material.

22. Set of sprockets according to claim 1, wherein at least one of the first and second contact points are defined at radial portions of the first sprocket and second sprocket.

23. Set of sprockets according to claim 1, wherein at least one of the first and second contact points are defined at radial extensions of the at least two spacers.

24. Set of sprockets according to claim 1, wherein the first and second sprockets have a thickness comprised between 1 and 2 mm.

25. Set of sprockets according to claim 24, wherein the thickness is comprised between 1.4 and 1.7 mm.

26. Sprocket assembly for a bicycle rear wheel, comprising at least one set of sprockets according to claim 1.

27. Bicycle, comprising a set of sprockets according to claim 1.

28. A bicycle rear wheel sprocket assembly, comprising:
a first sprocket with a first diameter separated from a second sprocket, with a diameter that is less than the first diameter, by at least two distinct spacers, the at least two spacers comprising a substantially annular body extending circumferentially about a freewheel body of a hub of a rear wheel for a bicycle, at least one of the first and second sprockets has circumferential engagement portions that are configured to engage with the freewheel body, wherein (i) an inner spacer of the at least two spacers contacts the second sprocket at a first contact point arranged at a first radial distance from a longitudinal rotation axis and
(ii) an outer spacer of the at least two spacers contacts the second sprocket at a second contact point arranged at a second radial distance from the longitudinal rotation axis, which is different from the first radial distance,
wherein the inner and outer spacers of the at least two spacers are radially spaced apart with respect to each other, and a radial distance between the first contact point and the second contact point being at least $\frac{1}{3}$ of a radial extension between the circumferential engagement portions of the at least one of the first and second sprockets and a radially outer end of the second sprocket as measured from the longitudinal rotation axis.

29. Sprocket assembly according to claim 28, wherein the radial distance between the first contact point and the second contact point is at least $\frac{1}{2}$ of the radial extension between the circumferential engagement portions and the radially outer end of the second sprocket.

30. Sprocket assembly according to claim 28, wherein the radial distance between the first contact point and the second contact point being at least $\frac{2}{3}$ of the radial extension between the circumferential engagement portions and the radially outer end of the second sprocket.

31. Sprocket assembly according to claim 28, comprising a radially outer toothing having a number of teeth greater than or equal to 15.

32. Sprocket assembly according to claim 31, wherein the toothing has a number of teeth that is greater than or equal to 18.

33. Sprocket assembly according to claim 28, comprising at least one intermediate contact area between the first contact point and the second contact point.

34. Sprocket assembly according to claim 33, comprising a contact surface extending between the first contact point and the second contact point.

35. Sprocket assembly according to claim 28, comprising a plurality of contact areas defined in a radially inner annular portion of the second sprocket.

36. Sprocket assembly according to claim 35, wherein the first contact point is defined in the radially inner annular portion.

37. Sprocket assembly according to claim 28, comprising a plurality of contact areas arranged in a radially outer annular portion of the second sprocket.

38. Sprocket assembly according to claim 37, wherein the second contact point is defined in the radially outer annular portion.

39. Sprocket assembly according to claim 28, wherein at least one of the first and second contact points are defined at radial portions of the second sprocket.

40. Sprocket assembly according to claim 28, having a thickness comprised between 1 and 2 mm.

41. Sprocket assembly according to claim 40, wherein the thickness is between 1.4 and 1.7 mm.

42. A set of sprockets for a bicycle rear wheel, comprising:
a first sprocket with a first diameter, a second sprocket with a diameter that is less than the first diameter, and at least two distinct spacers arranged between the first sprocket and the second sprocket, wherein the first sprocket is separated from the second sprocket by the at least two spacers, wherein at least one of the first and second sprockets has a radially inner annular portion and a radially outer annular portion, the at least two spacers extend circumferentially about a freewheel body of a hub of the bicycle rear wheel, and contact said first or second sprocket along an axial end surface defined along an entire circumferential extent of the radially inner annular portion and along an entire circumferential extent of the radially outer annular portion.

43. A set of sprockets according to claim 42, wherein the inner and outer annular portions are separated by connecting arms.

44. A set of sprockets according to claim 42, wherein the inner annular portion is an engagement portion to engage the freewheel body and the outer annular portion is distinct from the inner annular portion.

* * * * *

UNITED STATES PATENT AND TRADEMARK OFFICE
CERTIFICATE OF CORRECTION

PATENT NO. : 8,821,330 B2
APPLICATION NO. : 12/187603
DATED : September 2, 2014
INVENTOR(S) : Giuseppe Dal Pra and Leopoldo Lazzarin It is certified that error appears in the above-identified patent and that said Letters Patent is hereby corrected as shown below:

ON THE TITLE PAGE

Item (75), under "Inventors", in Column 1, Line 1, delete "Zane" and insert -- Zané --, therefor.

Item (73), under "Assignee", in Column 1, Line 1, delete "Compagnolo" and insert -- Campagnolo --, therefor.

IN THE SPECIFICATION

Column 4, Line 15, delete "a lager" and insert -- a larger --, therefor.

Column 7, Line 13, delete "The sprocket" and insert -- the sprocket --, therefor.

Column 7, Line 15, delete "The sprocket" and insert -- the sprocket --, therefor.

Column 8, Line 45, delete "sprocket at least" and insert -- sprocket at at least --, therefor.

Column 8, Line 46, delete "at least one" and insert -- at at least one --, therefor.

Column 9, Line 28, delete "at least" and insert -- at at least --, therefor.

Column 9, Line 29, delete "at least" and insert -- at at least --, therefor.

Column 11, Line 15, delete "chain. the" and insert -- chain. The --, therefor.

IN THE CLAIMS

Column 19, Line 52, in Claim 6, delete "at least" and insert -- at at least --, therefor.

Signed and Sealed this
Tenth Day of February, 2015

Michelle K. Lee
*Deputy Director of the United States Patent and Trademark Office*